(12) United States Patent
Kachmar et al.

(10) Patent No.: US 9,343,882 B2
(45) Date of Patent: May 17, 2016

(54) POWER CABLE WITH ABILITY TO PROVIDE OPTICAL FIBER UPGRADE

(71) Applicants: Tyco Electronics (Shanghai) Co. Ltd., Shanghai (CN); ADC Telecommunications, Inc., Berwyn, PA (US)

(72) Inventors: Wayne M. Kachmar, North Bennington, VT (US); William F. Wright, Williamstown, MA (US); Thomas P. Huegerich, Manchester Center, VT (US); Lizhang Yang, Shanghai (CN); William Jacobsen, Hoosick Falls, NY (US); Aly Fahd, Troy, NY (US)

( * ) Notice: Subject to any disclaimer, the term of this patent is extended or adjusted under 35 U.S.C. 154(b) by 130 days.

(21) Appl. No.: 14/192,234

(22) Filed: Feb. 27, 2014

(65) Prior Publication Data
US 2014/0241679 A1 Aug. 28, 2014

Related U.S. Application Data

(60) Provisional application No. 61/770,687, filed on Feb. 28, 2013, provisional application No. 61/860,505, filed on Jul. 31, 2013.

(51) Int. Cl.
G02B 6/44 (2006.01)
H02G 1/14 (2006.01)
H02G 15/18 (2006.01)
G02B 6/255 (2006.01)
(Continued)

(52) U.S. Cl.
CPC ................. *H02G 1/14* (2013.01); *G02B 6/2558* (2013.01); *G02B 6/4416* (2013.01); *G02B 6/4466* (2013.01); *H02G 15/18* (2013.01); *G02B 6/4417* (2013.01); *G02B 6/54* (2013.01); *H02G 1/06* (2013.01); *Y10T 29/49194* (2015.01)

(58) Field of Classification Search
CPC .......................................................... H02G 1/14
See application file for complete search history.

(56) References Cited

U.S. PATENT DOCUMENTS

| 5,557,703 | A | 9/1996 | Barker et al. |
| 5,677,974 | A | 10/1997 | Elms et al. |
| 5,793,921 | A | * | 8/1998 | Wilkins .............. G02B 6/4446 174/77 R |

(Continued)

FOREIGN PATENT DOCUMENTS

| EP | 0 968 556 B1 | 5/2003 |
| WO | WO 2013/103858 A1 | 7/2013 |

OTHER PUBLICATIONS

Air Blown Fiber Unit, Samsung, 1 page (Date Unknown).
(Continued)

*Primary Examiner* — Jerry Rahll
(74) *Attorney, Agent, or Firm* — Myers Bigel & Sibley, PA

(57) ABSTRACT

The disclosed power cable enables optical fibers to be installed after the power cable has been installed, thereby forming a hybrid cable. Segments of the power cable are manufactured with fiber installation tubes containing pulling members. When the power cable segments are coupled together, the fiber installation tubes and pulling members also are coupled together to form a fiber installation conduit and an extended pulling member. A fiber pull arrangement can be coupled to the extended pulling member and drawn through the fiber installation conduit within the power cable at any time subsequent to installation of the power cable.

14 Claims, 18 Drawing Sheets

(51) Int. Cl.
*G02B 6/54* (2006.01)
*H02G 1/06* (2006.01)

(56) References Cited

U.S. PATENT DOCUMENTS

| | | | |
|---|---|---|---|
| 5,997,186 A | | 12/1999 | Huynh et al. |
| 6,101,304 A | | 8/2000 | Quistorff et al. |
| 6,104,846 A | * | 8/2000 | Hodgson .............. G02B 6/2551 |
| | | | 385/12 |
| 6,173,107 B1 | | 1/2001 | Reeve et al. |
| 6,421,487 B1 | | 7/2002 | Hutton et al. |
| 6,511,047 B1 | | 1/2003 | Clemente, Jr. et al. |
| 7,450,805 B2 | | 11/2008 | Park et al. |
| 7,574,086 B2 | | 8/2009 | Oh et al. |
| 7,717,658 B2 | | 5/2010 | Peltier |
| 7,901,243 B1 | | 3/2011 | Yaworski |
| 2009/0060431 A1 | | 3/2009 | Lu |
| 2009/0087153 A1 | | 4/2009 | Weiss et al. |
| 2009/0202208 A1 | | 8/2009 | Park |
| 2012/0020632 A1 | | 1/2012 | Shiobara et al. |
| 2013/0016948 A1 | | 1/2013 | Smith et al. |

OTHER PUBLICATIONS

Copper ShearBolt Connectors, Tyco Electronics Corporation, 1 page (2004-2005).

Emtelle Product Catalogue—12 Fibre Unit, http://www.emtelle.com/catalogueProduct.php?product.php?productId=351&output=print, 1 page (Date Printed Dec. 28, 2012).

Emtelle Product Catalogue—4 Fibre Unit, http://www.emtelle.com/catalogueProduct.php?product.php?productId=349&output=print, 1 page (Date Printed Dec. 28, 2012).

Fibre Products, http://www.emtelle.com/print.html, 1 page (Date Printed Dec. 28, 2012).

Fibre Products: Micro and Mini Cable, http://www.emtelle.com/print.html, 1 page (Date Printed Dec. 28, 2012).

Knisley, J., "Future-Proofing with Air Blown Fiber," Electrical Construction & Maintenance, 2 pages (Apr. 1, 1999).

Liverpool high-voltage cabling project deploys Emtelle's uPVC solution, Emtelle, 2 pages (Date Unknown).

Nexans Germany develops medium-voltage hybrid cable for transmission and distribution networks, Nexans Deutschland GmbH, 2 pages (Mar. 29, 2011).

Nexans MV-Hybridcable, Version 1.5, 4 pages (Dec. 26, 2012).

Nexans presents its new low-voltage hybrid cable X-LINKED™ for 1 kV distribution network, http://www.nexans.de/eservice/navigation/NavigationPublicationOnly.nx?forPrint=true& . . . , 1 page (Date Printed Dec. 28, 2012).

Nexans Stromversorgung and FTTH-Bereitstellung, 4 pages (Aug.-Sep. 2011).

Power Cable Accessories Catalogue, Tyco Electronics, 57 pages (2003/2004).

International Search Report and Written Opinion for Application No. PCT/US2014/016840 mailed Dec. 2, 2014.

* cited by examiner

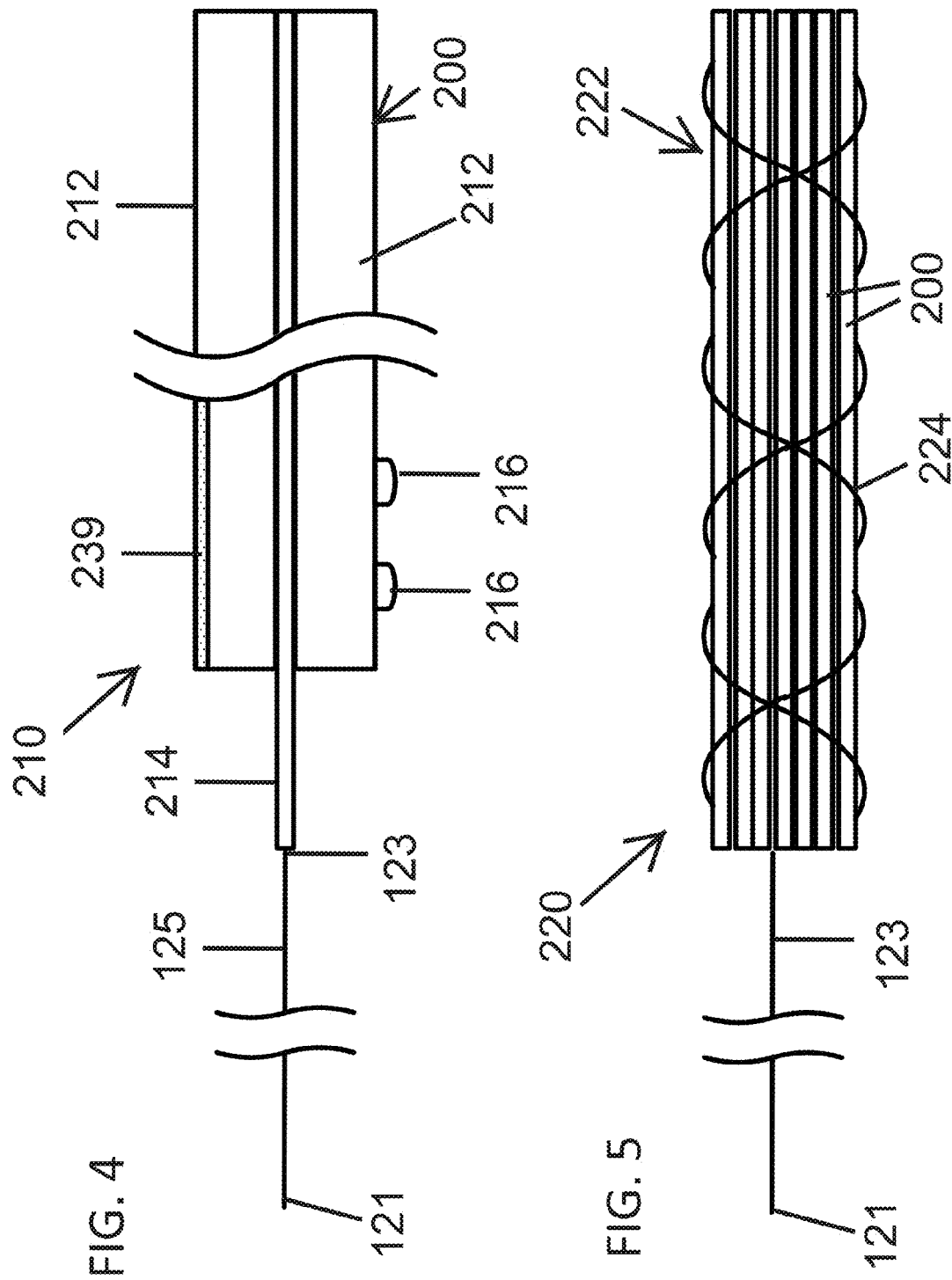

POWER CABLE WITH ABILITY TO PROVIDE OPTICAL FIBER UPGRADE

CROSS-REFERENCE TO RELATED APPLICATIONS

This application claims the benefit of U.S. Provisional Application No. 61/770,687, filed Feb. 28, 2013, and titled "Power Cable with Ability to Provide Optical Fiber Upgrade," and U.S. Provisional Application No. 61/860,505, filed Jul. 31, 2013, and titled "Power Cable with Ability to Provide Optical Fiber Upgrade," the disclosures of which are hereby incorporated herein by reference.

BACKGROUND

Power cables are routed to a variety of locations such as businesses, dwelling units, buildings, government centers, etc. to provide electric power. The use of hybrid cables that connect optical fiber to these locations along the power cable line has been found to be advantageous. For example, the optical fiber or fibers could be used to transmit data signals related to power network situation and/or could be used to provide data related services to those locations.

Power cables tend to have large cross sections resulting in practical weight and size limitations for spooling of the power cables. Accordingly, in many power installation situations, multiple power cable segments are spliced together at splice points to complete the routing instead of laying one large power cable. At a typical splice point, conductors and shielding of the power cable segments are electrically connected together. When power and optical fiber hybrid cables are used, fiber splices are needed in such splicing locations. Such optical fiber splicing creates difficulties and wastes for the power cable splicing operation.

The cost of providing/manufacturing the optical fibers is usually a small fraction of the cost of providing/manufacturing the power cable. If any of the optical fibers in a hybrid cable are damaged, the repair or replacement of all or part of the power cable portion of the hybrid cable is significantly greater than the repair or replacement of all or part of the fiber portion of the hybrid cable.

Therefore, it is desirable to provide an integrated fiber/power cable technical solution to address the cable splicing issue and optical fiber repair/replacement issue.

SUMMARY

Power cables are routed to a variety of locations such as businesses, dwelling units, buildings, government centers, etc. It is anticipated there will be a need/desire in the future to provide fiber optic telecommunications services to such locations. Aspects of the present disclosure relate to methods and devices for using pre-installed power cables as conduits for efficiently upgrading such locations with fiber optic telecommunication services.

One aspect of the present disclosure relates to a power cable including means for effectively routing optical fiber through the power cable after the power cable has been installed. In one example, the power cable includes a fiber installation tube containing a pulling member for use in pulling optical fiber into the fiber installation tube. In certain implementations, the power cable includes multiple separate electrical conductors that wind in a helix about a central axis of the power cable. In one example, the fiber installation tube is centered on the central axis. In other implementations, however, the fiber installation tube can be disposed anywhere within the transverse cross-sectional area of the cable. In one example, the pulling members of two spliced power cable segments are interconnected at the splice location, and the fiber installation tubes of the two spliced power cable segments are also interconnected at the splice location. In this way, the interconnected fiber installation tubes and pulling members cooperate to form a fiber installation conduit and fiber pulling structure that extend continuously across the splice location. In certain examples, the fiber installation can be facilitated using air-assisted pulling techniques.

Another aspect of the present disclosure relates to a method of installing a hybrid power cable within an operating environment. The method includes laying out a plurality of cable segments in the operating environment so that adjacent longitudinal ends face each other to form splice regions; at each splice region, splicing together facing ends of conductors of the cable segments at a first location within a transverse cross-sectional area of the hybrid power cable; routing optical fibers into installation tubes disposed within the cable segments; and at each splice region, splicing together facing ends of the optical fibers at a second location that is spaced from the first location. In certain implementations, the second location resides in a fiber optic closure.

Another aspect of the present disclosure relates to an optical fiber structure adapted to be pulled into the fiber installation tube. In one example, the optical fiber structure includes a plurality of optical fibers arranged in an optical fiber ribbon, and a tensile reinforcing tape affixed to the optical fiber ribbon. In one example, the tensile reinforcing tape is affixed to the optical fiber ribbon using a low adhesion adhesive such that the optical fiber ribbon can be pealed from the tensile reinforcing tape without damaging the optical fiber ribbon. In one example, the tensile reinforcing tape includes, but is not limited to, aramid yarn and Ultra-high-molecular-weight polyethylene (UHMWPE) fiber or tape. In one example, the tensile reinforcing tape allows the optical fiber ribbon to be pulled into the fiber installation tube without breaking the optical fibers, and also allows the optical fiber ribbon to be pulled from the fiber installation tube for replacement or repair. In certain examples, the tensile reinforcing tape, which is coupled with new optical fiber ribbon, can be attached to the pulling member such that the pulling member can be used to pull the tensile reinforcing tape and the optical fiber ribbon attached thereto into the fiber installation tube. In certain examples, the tensile reinforcing tape can be used as a pulling member to pull new optical fiber ribbon into the fiber installation tube to replace existing optical fiber ribbon within the fiber installation tube.

In accordance with some aspects of the disclosure, a power cable includes a plurality of insulated conductors extending along a length of the extended power cable; a reinforced fiber installation tube extending along the length of the extended power cable; and a pulling member extending through an axial passage of the reinforced fiber installation tube. The insulated conductors are stranded together within a cable sheath. In an example, the reinforced fiber installation tube is disposed along a generally central axis of the stranded insulated conductors.

In accordance with other aspects of the disclosure, a method of installing optical fibers within a power cable having a reinforced fiber installation conduit includes installing the power cable in an operating environment; attaching a fiber pull arrangement to a first end of a pulling member extending through the reinforced fiber installation conduit; and accessing an opposite end of the pulling member. The fiber pull arrangement includes optical fibers. The method also includes pulling the opposite end of the pulling member to draw the fiber pull arrangement into and through the reinforced fiber installation conduit. In certain implementations, air or other gases can be blown down the fiber installation conduit to assist in the movement of the fibers through the conduit.

In accordance with other aspects of the disclosure, a hybrid cable includes a plurality of sheaths having axially ends coupled together by sheath connecting members to form an extended cable; a plurality of insulated conductor having axial ends coupled together by conductor splicing arrangements to form extended insulated conductors within the extended cable; a plurality of reinforced fiber installation tubes having axial ends coupled together by tube connecting members to form an extended fiber installation conduit within the extended cable; and a fiber pull arrangement disposed within the extended fiber installation conduit. The fiber pull arrangement includes a plurality of optical fibers coupled to one or more strength members.

In accordance with other aspects of the disclosure, a method of installing an extended power cable within an operating environment includes routing power cable segments along a routing path within the operating environment. Each of the power cable segments is disposed so that axial ends of the power cable segments face each other. The method also includes electrically coupling together insulated conductors of adjacent power cable segments; accessing axial ends of pulling members extending through reinforced fiber installation tubes of the power cable segments; joining together the pulling members of adjacent ones of the power cable segments to form an extended pulling member; joining together the reinforced fiber installation tubes of adjacent ones of the power cable segments using closure members to form an extended fiber installation conduit; and joining together the sheaths of adjacent power cable segments to form an extended power cable containing the extended fiber installation conduit, which contains the extended pulling member. Optical fibers are installed by attaching the optical fibers to the extended pulling member; drawing the extended pulling member through the extended fiber installation conduit; and detaching the extended pulling member from the optical fibers. In certain implementations, the extended pulling member is fully removed from the extended installation conduit to draw in the optical fibers.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIGS. 4-8 illustrate fiber pull arrangements suitable for installation within the extended fiber installation tube of FIG. 1;

DETAILED DESCRIPTION

Figure 1:
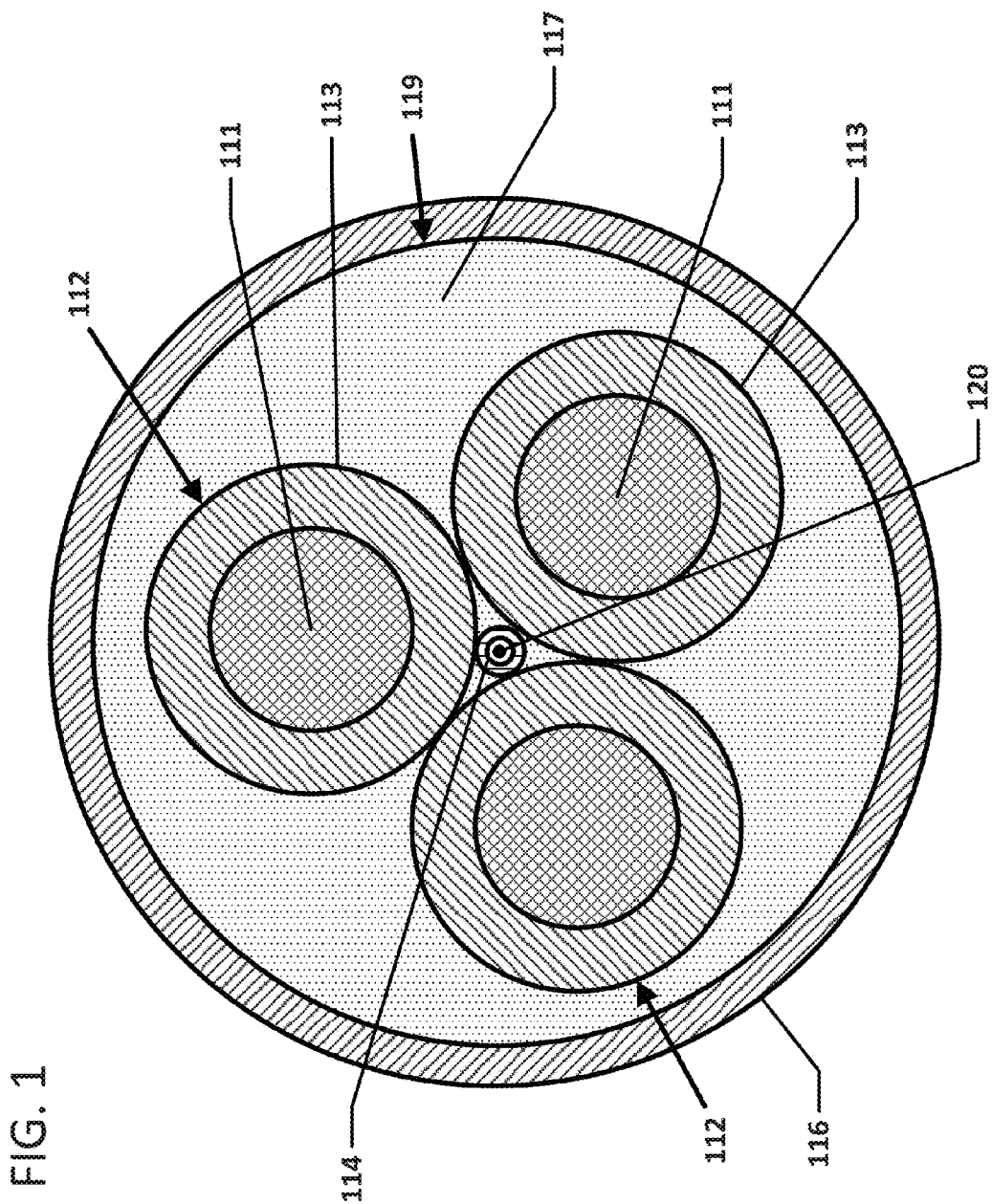
FIG. 1 is a schematic diagram of a cross-section of an example power cable segment.

Reference will now be made in detail to exemplary aspects of the present disclosure that are illustrated in the accompanying drawings. Wherever possible, the same reference numbers will be used throughout the drawings to refer to the same or like parts.

In general, the disclosure provides systems and methods for installing one or more optical fibers within an electrical power cable to form a hybrid cable. The cable can be installed in an underground pipe having one or more access points. A power cable segment or an extended power cable can be routed through the pipe. The extended power cable is formed from power cable segments connected together (e.g., spliced) at the access points. In an example, the access points are depicted as manholes. In other examples, however, the access points can be implemented as handholes, closure boxes, or other node points. In other implementations, the power cable segments can be connected together at locations spaced from the access points. For convenience, however, the disclosure will refer to the connection points between power cable segments as being located at the access points.

The power cable includes one or more power cable segments joined (e.g., spliced) together. Each power cable segment includes one or more power conductors. The power cable segments are manufactured with fiber installations tubes/conduits (e.g., reinforced furcation tubes) extending through the power cable segments. A pulling member (e.g., a pulling string) is contained within each reinforced fiber installation tube.

The power cable can be deployed (e.g., direct buried, routed through an underground conduit, deployed aerially, or otherwise deployed) in an underground pipe or other conduit. In some implementations, optical fibers can be installed in the power cable when the power cable is deployed in the field. In other implementations, the optical fibers can be installed in the power cable after the power cable has been deployed. In some implementations, the optical fibers are pulled through one power cable segment at a time. In other implementations, the optical fibers are pulled through multiple power cable segments joined together.

When two or more power cable segments are joined together at splice points to form the power cable, conductors of the cable segments can be joined together (e.g., using shear-bolt connectors) at the splice points. In certain implementations, a fiber optic closure (e.g., a fiber storage box) can be disposed at one or more of the ends of the power cable segments (e.g., the power cable distal ends and/or the splice points). Optical fibers can be pulled through individual power cable segments towards or away from one of the fiber optic closures. In other implementations, the fiber installation tubes can be coupled together to form a fiber installation conduit and the pulling members can be coupled together to form an extended pulling member. Optical fibers can be pulled through the fiber installation conduit via the extended pulling member.

In some implementations, the power cable segments can be at least 250 meters in length. In an example, the power cable segments can be about 500 meters in length. In certain implementations, the power cable segments can be about 1000 meters in length. In certain implementations, the power cable or power cable segments are configured to bend along the installation path. For example, the power cable or power cable segments can contain one or more 90° bends along the installation path with a bend radius of 0.5 meters. In an example, the power cable or segments may contain four or more such 90° bends.

After deployment of at least one power cable segment, a fiber pulling arrangement can be coupled to the pulling member (or extended pulling member) and pulled through the fiber installation tube (or fiber installation conduit) within the power segment or cable. In certain implementations, air or another gas can be blown down the fiber installation tube or conduit to assist the pulling of the fiber pulling arrangement (e.g., to decrease the amount of force necessary to pull the fiber pulling arrangement through the conduit).

FIG. 1 is a schematic diagram of a cross-section of an example power cable segment 110. The example power cable segment 110 includes a core 119 contained within the sheath 116. In certain implementations, the core 119 includes a gel 117 (e.g., water-blocking gel) disposed about the insulated conductors 112 and contained within the sheath 116. In some implementations, the sheath 116 includes a dielectric outer jacket. In certain implementations, the sheath 116 includes a conductive shield layer that is surrounded by one or more dielectric layers.

In the example shown, the core 119 includes three insulated conductors 112 and a fiber installation tube 114. In other implementations, however, the core 119 can include a greater or lesser number of insulated conductors 112 (e.g., one, two, four, etc.). Each insulated conductor 112 includes a copper or otherwise electrically conductive member 111 surrounded by a layer of dielectric material 113. In some implementations, the dielectric layer 113 can include one or more layers of shielding between one or more layers of dielectric material. In an example, the dielectric layer 113 includes an outer shielding layer (e.g., a metal mesh) surrounding a layer of insulation (e.g., rubber).

Each insulated conductor 112 is sufficiently sized to conduct power (e.g., low voltage power, medium voltage power, or high voltage power). For example, in some implementations, the insulated conductors 112 are configured to carry up to about 69 kV. In certain implementations, the voltage insulated conductors 112 are configured to carry between about 5 kV and about 50 kV. In certain implementations, medium voltage-type insulated conductors 112 are configured to carry between about 1 kV and 69 kV. In certain implementations, low voltage-type insulated conductors 112 are configured to carry up to about 1 kV.

In some implementations, the insulated conductors 112 extend along the lengths of the power cable segments 110 and helically wind about central axes C of the power cable segments 110 as the insulated conductors 112 extend along the lengths of the cable segments 110. In this way, the insulated conductors 112 are stranded (e.g., planetary stranded) about the central axis C (e.g., see FIG. 15) of the segments 110. In certain implementations, the fiber installation tube 114 can be routed through a middle of the wound conductors 112 so that the fiber installation tube 114 remains in a generally linear configuration aligned with the central axis C. In other implementations, however, the fiber installation tube 114 can be disposed anywhere within the transverse cross-sectional area of the cable segment 110.

Figure 2:
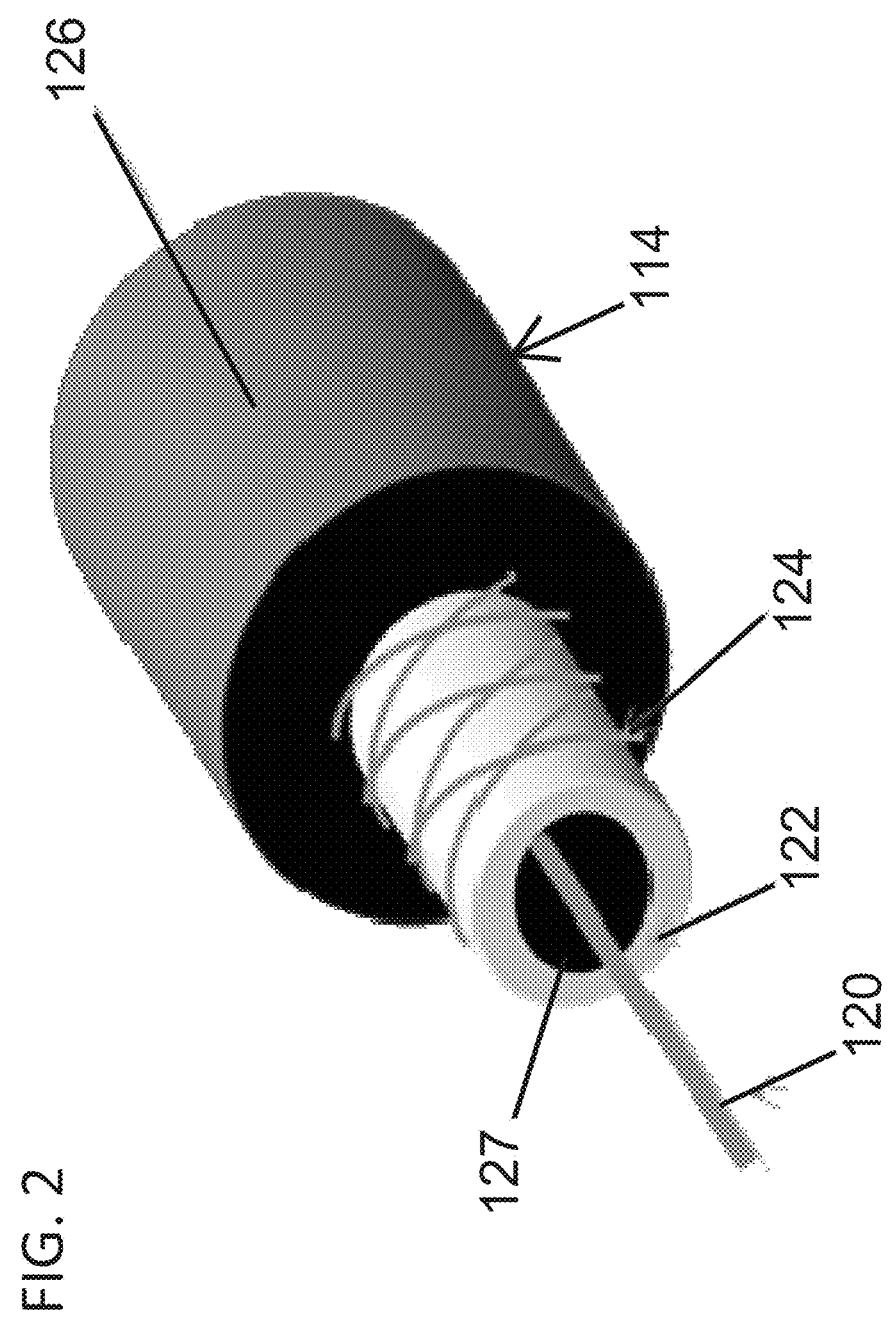
FIG. 2 is a perspective view of an example reinforced fiber installation tube suitable for forming the fiber installation conduit of the power cable installation of FIG. 1.
Figure 3:
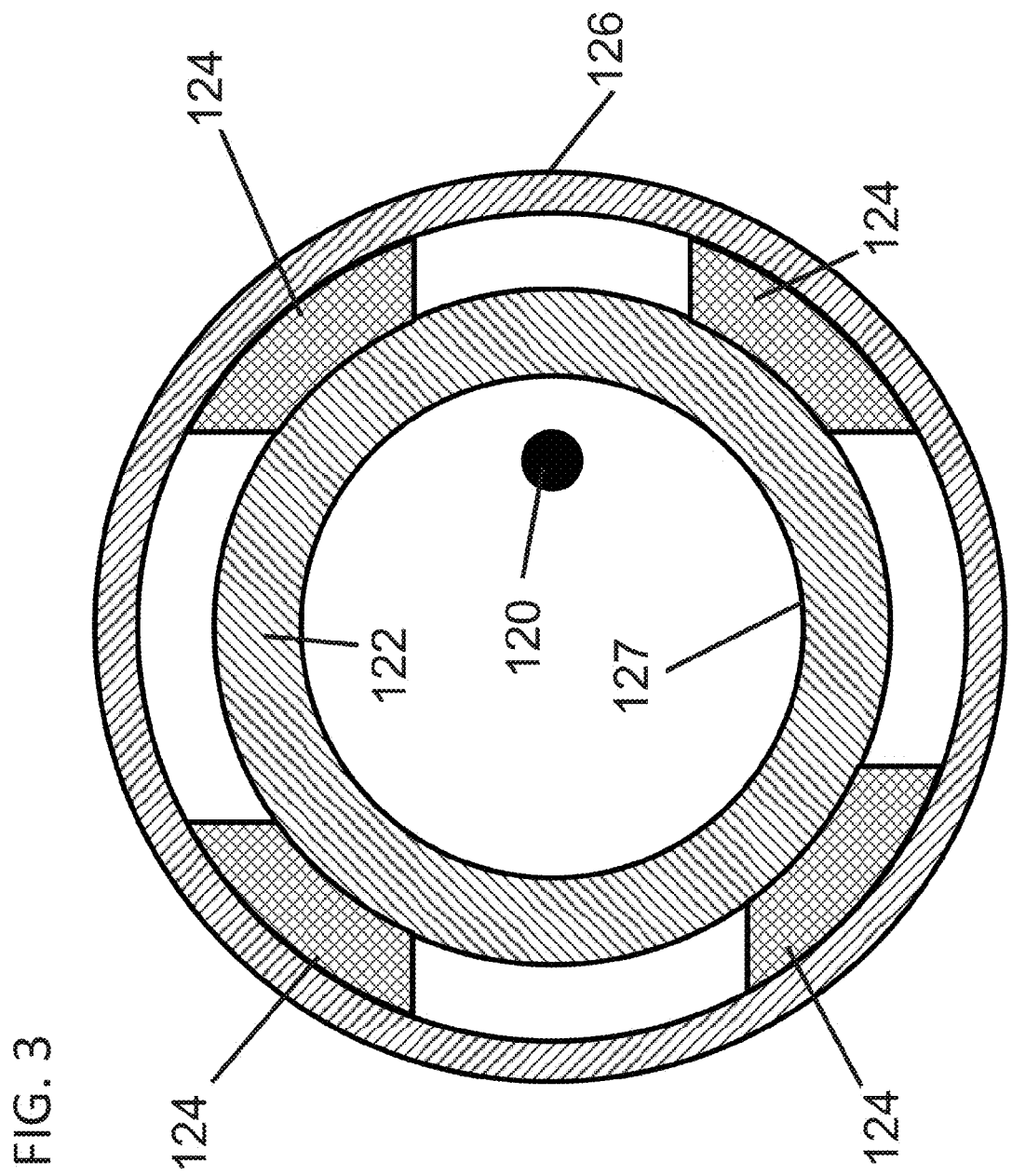
FIG. 3 shows a transverse cross-section of the reinforced fiber installation tube of FIG. 2.

FIGS. 2 and 3 illustrate an example fiber installation tube 114 suitable for use in the power cable segments 110. In the example shown, the fiber installation tube 114 is a dual reinforced furcation tube configured to accommodate tensile and elongation requirements of optical fibers and to protect optical fibers from damage by the surrounding conductors 112. The example fiber installation tube 114 includes a buffer tube 122 surrounded by a strength layer 124, which is surrounded by a jacket 126. The buffer tube 122 defines an axial passage 127 sized to receive one or more optical fibers. The axial passage 127 is hollow. In certain implementations, the axial passage 127 is dry (i.e., does not contain any gels (e.g., water blocking gels) or other liquids). In other implementations, the axial passage 127 can be lubricated. In certain implementations, a lubricant (e.g., talc) can be applied within the axial passage 127. The lubricant can provide friction reduction, water blocking characteristics, and/or fungus growth resistance properties to the fiber installation tube 114.

In some implementations, the strength layer 124 includes yarns (e.g., aramid yarn, fiberglass yarn, Ultra-high-molecular-weight polyethylene (UHMWPE) yarns, etc.) wrapped (e.g., helically, contra-helically, etc.) around the buffer tube 122. In other implementations, the strength layer 124 may include fibers, tapes, or other types of wrappings formed of aramid, fiberglass, UHMWPE, or other such materials. In various implementations, the strength layer 124 may provide tensile strength, shrink and expansion characteristics, and/or specific protection requirements (e.g., temperature range, fire retardance, water blockage, chemical resistance etc.) to the fiber installation tube 114. The jacket 126 can be extruded over the strength layer 124.

In some implementations, the buffer tube 122 and/or the jacket 126 can be formed of high density polyethylene (HDPE) thermoplastic. In other implementations, the buffer tube 122 and/or the jacket 126 can be formed of cross-linked polyethylene (XLPE). In an example, the buffer tube 122 and the jacket 126 are formed of HDPE. In another example, the buffer tube 122 and the jacket 126 are formed of XLPE. In another example, the buffer tube 122 is formed of HDPE and the jacket 126 is formed of XLPE. In another example, the buffer tube 122 is formed of XLPE and the jacket 126 is formed of HDPE. In an example, the buffer tube 122 is formed of HDPE. In an example, the buffer tube 122 is formed of XLPE. In an example, the jacket 126 is formed of HDPE. In an example, the jacket 126 is formed of XLPE.

As shown, each fiber installation tube 114 also includes a pulling member 120 (e.g., a pull string, pull cord, etc.) extending through the axial passage 127 between a first end 121 and a second end 123 (FIGS. 4 and 5). In some implementations, the pulling member 120 includes an aramid yarn or tape that is disposed within the fiber installation tube 114 during a forming and extrusion process. In other implementations, the pulling member 120 includes a fiberglass or UHMWPE fiber, tape, or other structure disposed within the fiber installation tube 114. The pulling member 120 enables the optical fibers to be pulled into the fiber installation tube 114 subsequent to the formation of the fiber installation conduit 115. In some implementations, the pulling member 120 is longer than the fiber installation tube 114 so that the ends 121, 123 extend outwardly from the axial passage 127 of the buffer 122. In other implementations, the pulling member 120 is the same length or slightly shorter than the fiber installation tube 114.

The power cable segment 110 is manufactured containing the fiber installation tube 114 and the pulling member 120. For example, the pulling member 120 can be disposed within the fiber installation tube 114 during a forming and extrusion process of the fiber installation tube 114 (e.g., during extrusion of the buffer 122). In other implementations, the pulling member 120 can be threaded into the fiber installation tube 114 subsequent to the manufacture of the fiber installation tube 114. Additional information about manufacturing a tube containing an example pulling member 120 can be found in PCT Application No. PCT/US13/20335, filed Jan. 4, 2013, the disclosure of which is hereby incorporated herein by reference.

FIGS. 4-8 illustrate fiber pull arrangements 210, 220, 230, 240, 250 suitable for installation within the fiber installation tube 114 (or extended conduit). In some implementations, any of the fiber pull arrangements 210, 220, 230, 240, 250 can be installed at any point subsequent to deployment of the power cable 118. In other implementations, any of the fiber pull arrangements 210, 220, 230, 240, 250 can be installed during deployment of the power cable 118.

In certain implementations, the fiber pull arrangements 210, 220, 230, 240, 250 can be configured to reduce friction between the fiber pull arrangements 210, 220, 230, 240, 250 and the fiber installation tube 114 or conduit 115. In certain implementations, the fiber pull arrangements 210, 220, 230, 240, 250 can include bumps (e.g., bumps 216 of FIG. 4) or another texturized surface that reduces the contact area between the pull arrangements 210, 220, 230, 240, 250 and the fiber installation tube 114 or conduit 115. In certain implementations, a lubricant 239 (e.g., talc, silicone, etc.) can be applied to the fiber pull arrangements 210, 220, 230, 240, 250 (e.g., see FIGS. 4 and 6-8). The lubricant 239 can provide friction reduction, water blocking characteristics, and/or fungus growth resistance properties to the fiber pull arrangements 210, 220, 230, 240, 250.

In general, fiber pull arrangements 210, 220, 230, 240, 250 include optical fibers coupled to a strength member. In some implementations, the fiber pull arrangements 210, 220, 230, 240, 250 include at least four optical fibers. In certain implementations, the fiber pull arrangements 210, 220, 230, 240, 250 include at least eight optical fibers. In certain implementations, the fiber pull arrangements 210, 220, 230, 240, 250 include at least twelve optical fibers. In certain implementations, the fiber pull arrangements 210, 220, 230, 240, 250 include about twenty-four optical fibers.

FIG. 4 shows a first type of fiber pull arrangement 210 that includes one or more optical fiber ribbons 212 that are coupled to the extended pulling member 125. The optical fiber ribbons 212 can each include one or more rows of optical fibers 200 bonded together by a polymeric matrix to form a ribbon structure. In the example shown, the first fiber pull arrangement 210 includes two optical fiber ribbons 212. In certain implementations, the optical fiber ribbons 212 are attached to a strip of tensile reinforcing tape 214 (e.g., aramid tape, UHMWPE tape, etc.) or another such tensile strength member that extends along the length of the fiber ribbons 212. An end 121, 123 of a pulling member 120 or an extended pulling member 125 is attached to the strip of tape 214 depending on the direction in which the fiber is to be pulled through the fiber installation conduit 115. In the example shown, the tape 214 is attached to the second end 123. The optical fiber ribbons 212 can be attached to the tape 214 by adhesive having a relatively low adhesion level such that the ends of the fiber ribbons 212 can be peeled from the tape 214 for processing.

FIG. 5 shows a second type of fiber pull arrangement 220 that includes a loose fiber core 222 that is held together by a wrapping 224. The loose fiber core 222 includes one or more separate optical fibers 200. In some implementations, the wrapping 224 includes helically or contra-helically wrapped tape, yarn, or other binding member. An end 121, 123 of the extended pulling member 125 is coupled to the wrapping 224 depending on the direction in which the fiber is to be pulled through the fiber installation conduit 115. In the example shown, the wrapping 224 is attached to the second end 123 of the extended pulling member 125.

Figure 6:
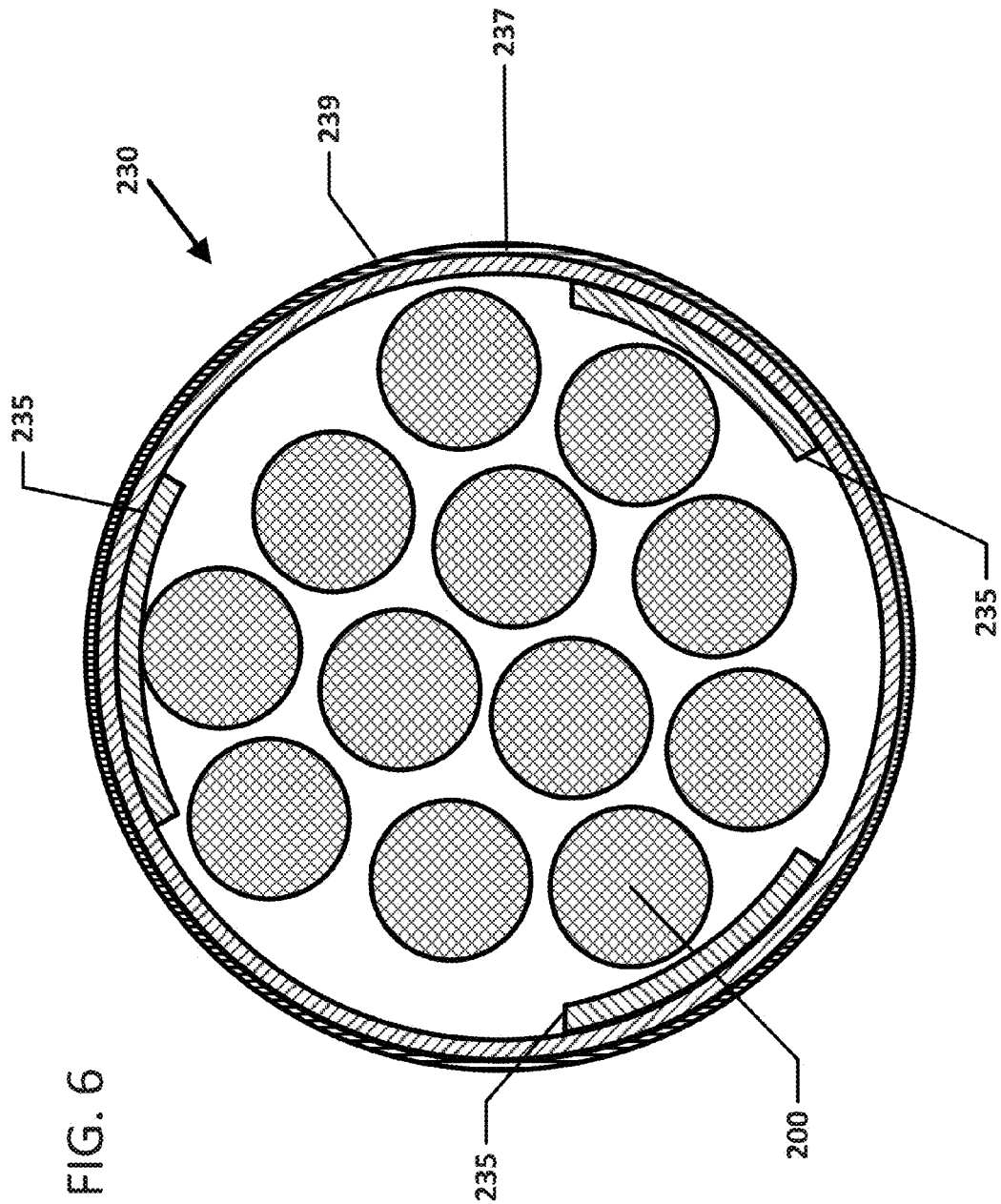
Figure 7:
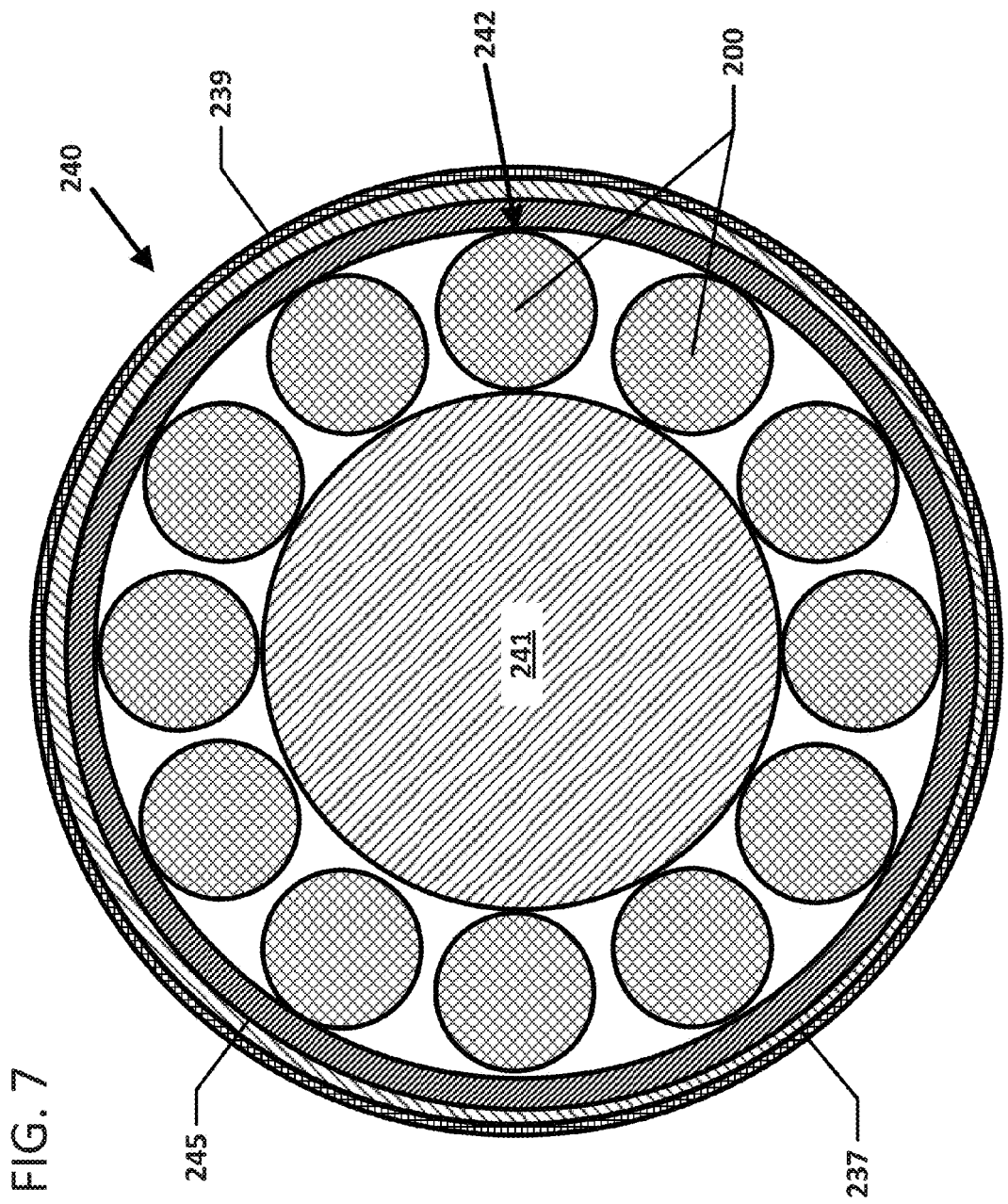
Figure 8:
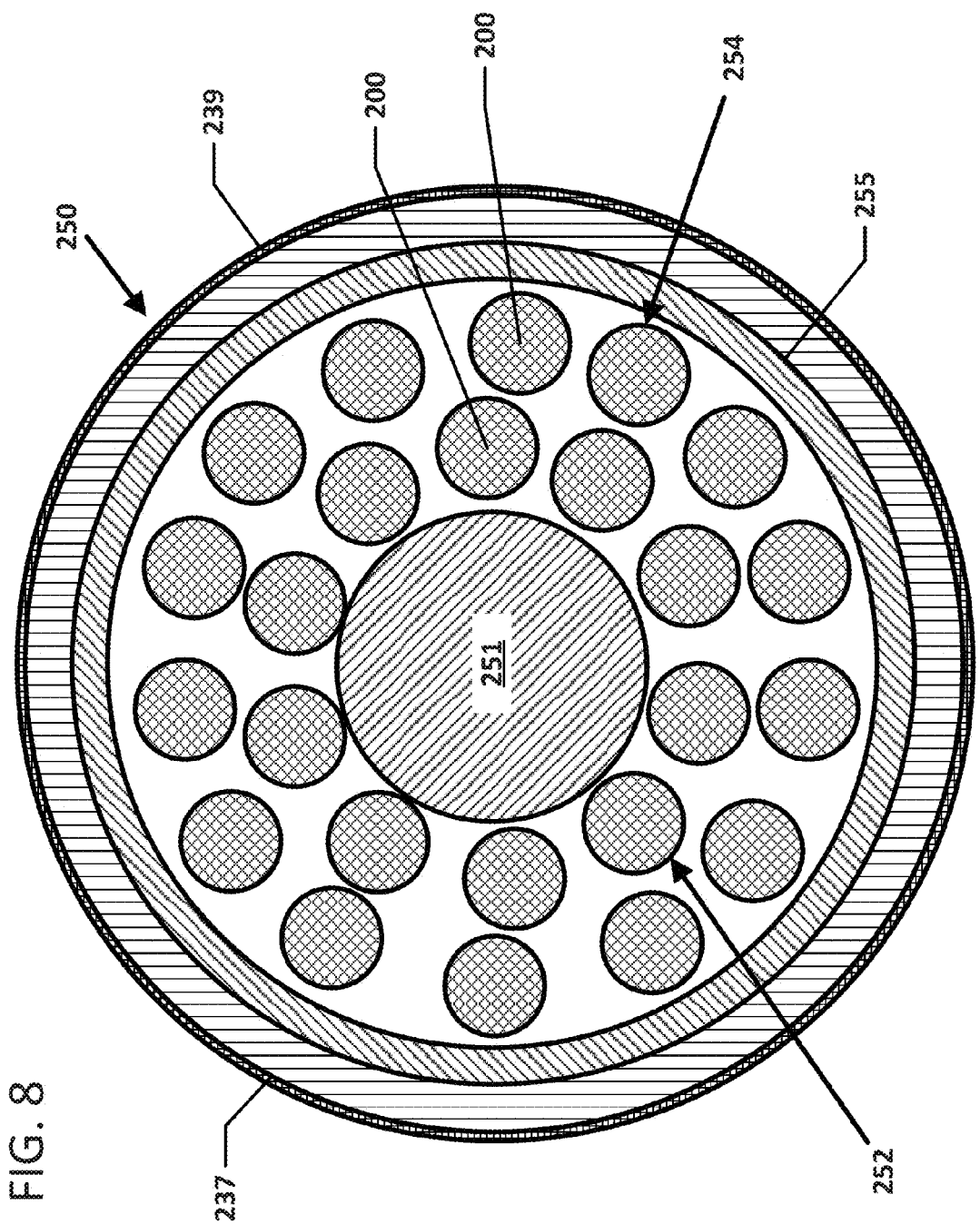

FIGS. 6-8 show other types of fiber pull arrangements 230, 240, 250 that each include an optical cable having optical fibers 200, strength members 235, 245, 255 (e.g., aramid yarn), and a surrounding jacket 237. As shown in FIG. 6, the cable 230 includes multiple loose optical fibers 200 and multiple strength member groups enclosed within the jacket 237. In the example shown, the strength members 235 are separated into three groups. In other implementations, the strength members 235 can be separated into greater or fewer groups. In still other implementations, the strength members 235 can fully surround the optical fibers 200.

As shown in FIGS. 7 and 8, the cable 240, 250 can include a center rod 241, 251. In some implementations, the rod 241, 251 includes a fiber reinforced plastic (FRP) material. In other implementations, the rod 241, 251 includes a glass reinforced plastic (GRP) material. In still other implementations, other materials can be used to form the rod 241, 251. In some implementations, the rod 241, 251 has a cross-dimension of less than about 1 mm. In certain implementations, the rod 241, 251 has a cross-dimension of less than about 0.8 mm. In an example, the rod 241 has a cross-dimension of about 0.7 mm. In certain implementations, the rod 251 has a cross-dimension of less than about 0.6 mm. In an example, the rod 251 has a cross-dimension of about 0.58 mm.

As shown in FIG. 8, the cable 250 includes a first layer 252 and a second layer 254 of optical fibers 200. The second layer 254 is disposed around the first layer 252. In an example, the first layer 252 includes ten optical fibers 200 and the second layer 254 includes fourteen optical fibers 200. In certain implementations, the strength members 255 of cable 250 surround the second layer 254 of optical fibers 200. In other implementations, the strength members 255 can be co-located with the optical fibers 200.

In some implementations, the cable 230, 240, 250 has an outer cross-dimension (e.g., diameter) of no more than about 2.5 mm. In certain implementations, the cable 230, 240, 250 has an outer cross-dimension of no more than about 2.3 mm. In certain implementations, the cable 230, 240, 250 has an outer cross-dimension of no more than about 2.1 mm. In certain implementations, the cable 230, 240, 250 has an outer cross-dimension of about 1.9 mm to about 2.0 mm. In an example, the outer cross-dimension of the jacket 210 is about 2 mm.

In some implementations of the cables 230, 240, 250, the jacket 237 has low friction properties. For example, in some implementations, the jacket 237 includes a high density polyethylene (HDPE) material containing compounds (e.g., silicone compounds) that lower the coefficient of friction. For example, the jacket 237 can include one or more polysiloxanes integrated into the material matrix of the jacket 237. In still other implementations, other materials can be used to form the jacket 237.

In some implementations of the cables 230, 240, 250, a lubricant 239 is placed over the jacket 237 of the cable 230, 240, 250 to facilitate routing the cable 230, 240, 250 through the installation tube 114 or conduit 115. In certain implementations, the lubricant 239 includes a liquid cable duct lubricant 239. Upon evaporation of a carrier (e.g., an aqueous carrier), the liquid lubricant 215 leaves a dry film over the jacket 237. The dry film can continue to lubricate the cable 230, 240, 250 (e.g., for subsequent replacements of all or part of the cable 230, 240, 250). In an example, the lubricant 239 includes a liquid silicone lubricant. When the carrier in the applied lubricant evaporates, the silicone remains to function as a lubricant.

In some implementations, a single power cable segment 110 is installed between two fiber access points. In such implementations, optical fibers 200 can be pulled into the power cable segment 110 either during deployment of the segment 110 or subsequent to deployment of the segment 110. In certain implementations, fiber optic closures can be installed at one or both access point of the cable segment 110. One or both ends of either the optical fibers 200 or the pulling member 120 are routed to the fiber optic closure(s) to facilitate access to the end(s) of the optical fibers 200.

After the optical fibers 200 are installed, the ends of the optical fibers can be spliced, connectorized, or otherwise coupled to equipment or other optical fibers. In an example, the optical fibers 200 can be accessed at the fiber optic closure for splicing, connectorizing, or storage. In another example, one or both ends of the optical fibers 200 can be spliced to connectorized stub fibers.

Figure 9:
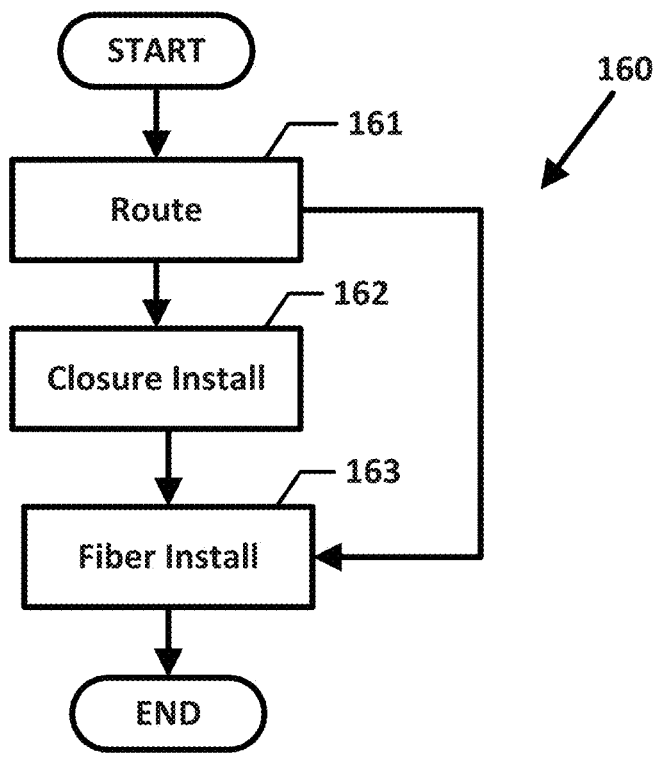
FIG. 9 is a flowchart illustrating a deployment process for a hybrid cable including a single cable segment.

FIG. 9 is a flowchart illustrating a first deployment process 160 for installing a single power cable segment 110 in the field. The first deployment process 160 assumes that additional power cable segments 110 are not needed to reach the destination of the cable. The deployment process 160 begins at start module 161 and proceeds to a routing step 161 during which the power cable segment 110 is laid/routed 110 through the underground pipe 101 or other conduit between access points.

Figure 10:
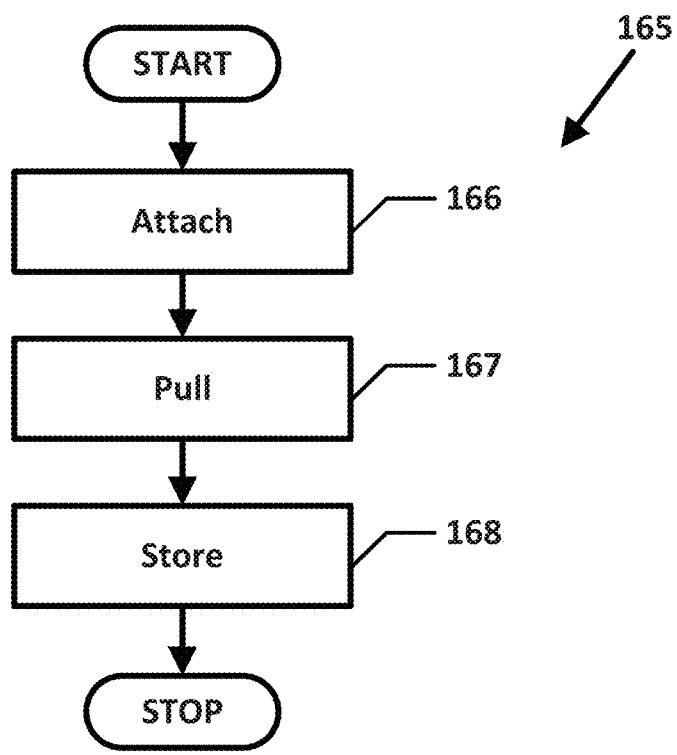
FIG. 10 is a flowchart illustrating a fiber installation process by which optical fibers are installed in a power cable.

In some implementations, the deployment process 160 proceeds directly to a fiber installation step 163 at which an optical fiber structure 210, 220, 230, 240, 250 is pulled through the installation tube 114 of the cable segment 110 (e.g., as described in the pulling process 165 of FIG. 10). In some implementations, the fiber installation step 163 is implemented during the deployment of the power cable segment 110. In other implementations, the power cable segment can be accessed subsequent to the deployment and the optical fiber structure 210, 220, 230, 240, 250 can be installed.

In other implementations, the deployment process 160 proceeds to an optional closure installation step 162 before the fiber installation step 163. As will be described in more detail herein, the closure installation step 162 routes an end 121, 123 of the pulling member 120 to a fiber optic closure (see closure 250 of FIG. 20). In certain implementations, the other end 121, 123 of the pulling member 120 can be routed to another closure. As will be described in more detail herein, the optical fiber structure 210, 220, 230, 240, 250 can be pulled towards or away from the closure. The optical fibers 200 can then be accessed at the fiber optic closure.

FIG. 10 is a flowchart illustrating one example fiber installation process 165 suitable for use in implementing the fiber installation step 163 of the first deployment process 160 described above. The fiber installation process 165 starts by attaching (see step 166) a fiber pull arrangement 210, 220, 230, 240, 250 to one end 121, 123 of the pulling member 120 at one end of the cable segment 110. The opposite end 121, 123 of the pulling member 120 is accessed at the other end of the power cable segment 110 and pulled (see step 167) out of the fiber installation tube 114. Pulling on the pulling member 120 causes the attached fiber pull arrangement 210, 220, 230, 240, 250 to move through the fiber installation tube 114.

In some implementations, the user can manually pull the fiber pull arrangement 210, 220, 230, 240, 250 through the fiber installation tube 114. In other implementations, the pulling member 120 can be pulled through the fiber installation tube 114 by a tension controlled pulling apparatus (e.g., a catapuller) or other such machine (e.g., under controlled tension and torque). In some implementations, the disposal of the fiber installation tube 114 is generally along the central axis C of the power cable segment 110. Such a configuration facilitates the drawing of the fiber pull arrangement 210, 220, 230, 240, 250 through the fiber installation tube 114 by mitigating bends and contours of the fiber installation tube 114. In other implementations, however, the fiber installation tube 114 can be disposed anywhere within the transverse cross-sectional area of the cable segment 110.

In some implementations, an end 121, 123 of the pulling member 120 is attached to the strip of tape 214 of the first fiber pull arrangement 210 depending on the direction in which the fiber is to be pulled through the fiber installation tube 114. In other implementations, an end 121, 123 of the pulling member 120 is coupled to the wrapping 224 depending on the direction in which the fiber is to be pulled through the fiber installation tube 114. In certain implementations, the liquid lubricant 239 is applied to an external surface of the pull arrangement 210, 220 before the pull arrangement 210, 220 enters the fiber installation tube 114.

In other implementations, the pull arrangement cable 230 is prepared by exposing sections of the strength member groups 235 and attaching the strength member groups 235 to the pulling member end 121, 123. For example, the strength members 235 can be glued together (e.g., using a cyanoacrylate). In certain implementations, heat shrink tubing may be applied over the strength members 235 and over the pulling member end 121, 123. In an example, the heat shrink tubing is applied over glued strength members 235. In certain implementations, the pulling member end 121, 123 can be tied to the strength members 235. In certain implementations, the liquid lubricant 239 is applied to an external surface of the cable 230 before the cable 230 enters the fiber installation tube 114.

In still other implementations, the pull arrangement cables 240, 250 are prepared by exposing a section of the center rod 241, 251 and a section of the strength members 245, 255 at one end of the cable 240, 250. An end 121, 123 of the pulling member 120 is coupled (e.g., using adhesive) to the exposed rod 241, 251 and at least one of the exposed strength members 245, 255. In certain implementations, the liquid lubricant 239 is applied to an external surface of the cable 240, 250 before the cable 240, 250 enters the fiber installation tube 114.

When the fiber pull arrangement 210, 220, 230, 240, 250 has been threaded through the fiber installation tube 114, the pulling member 120 can be detached from the fiber pull arrangement 210, 220, 230, 240, 250. In some implementations, the optical fibers 200 of the fiber pull arrangement 210, 220, 230, 240, 250 will have lengths that are substantially the same as the fiber installation tube 114. In other implementations, the optical fibers 200 of the fiber pull arrangement 210, 220, 230, 240, 250 will have lengths that are longer than the fiber installation tube 114.

Any excess length of the optical fibers 200 can be stored (see step 168) at one or both ends of the power cable segment 110. For example, excess length can be wrapped around a spool or other radius limiter arrangement, looped within a storage closure (e.g., see closure 250 of FIG. 14), or otherwise managed. In some implementations, the fibers 200 remain in the pull arrangement 210, 220, 230, 240, 250 (e.g., taped, wrapped, or cabled) after installation. In other implementations, ends of the fibers 200 can be broken out and/or connectorized.

In accordance with some aspects of the disclosure, multiple cable segments 110 can be coupled together using one or more cable splice arrangements to form an extended power cable 118. A cable splice arrangement 130 (FIGS. 12, 14-16, and 20) forms a physical connection between adjacent power cable segments 110. Each cable splice arrangement 130 includes a conductor splice arrangement 132 to physically and electrically connect the insulated conductors 112 of the power cable segments 110 to form extended insulated conductors. In certain implementations, the cable splice arrangement can include a fiber splice arrangement.

Figure 11:
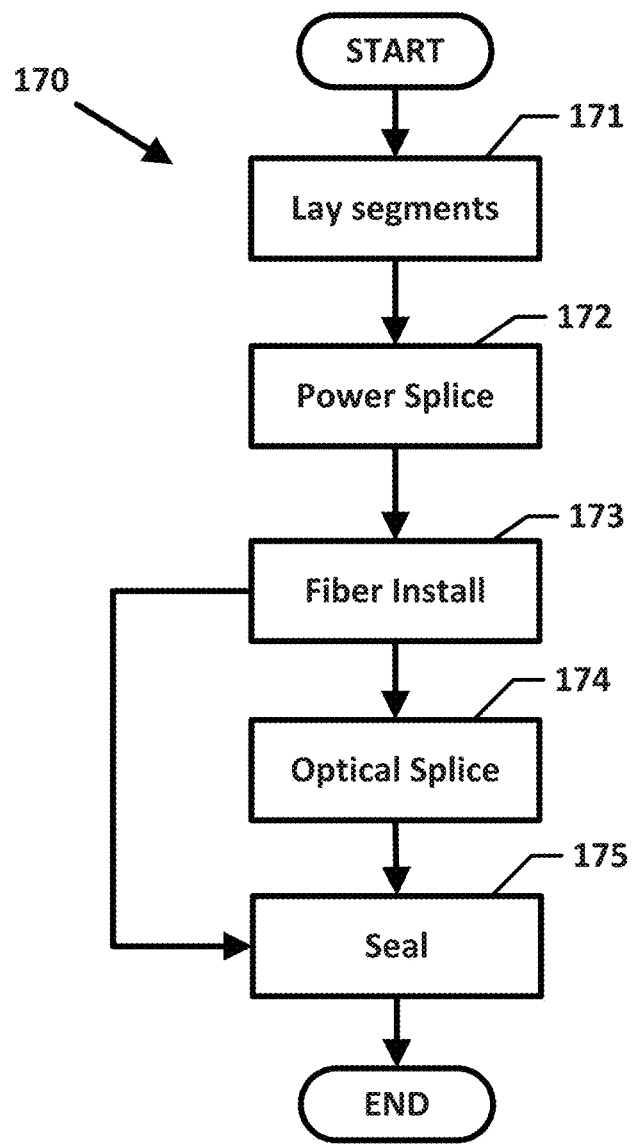
FIG. 11 is a flowchart illustrating a deployment process for a hybrid cable including multiple cable segments.

FIG. 11 illustrates a second deployment process 170 for deploying an extended power cable 118 including multiple cable segments 110 and installing the optical fibers 200 during deployment. The second deployment process 170 starts by laying (see step 171) two or more adjacent cable segments 110 that will form the extended power cable 118. The cable segments 110 are positioned so that one axial end of a first cable segment 110 faces an axial end of a second cable segment 110. The facing axial ends are spaced away from each other.

A power splice step 174 physically and electrically joins the conductors 112 of the adjacent power cable segments 110. For example, the conductor splice arrangement 132 can include a shear bolt connectors 131 having conductive sleeves into which ends of the conductive members 111 of the conductors 112A, 112B are inserted (see FIGS. 14-16). In an example, one shear bolt connector 131 is used to couple together one pair of conductors 112A, 112B. Additional information regarding shear bolt connectors 131 can be found in U.S. Pat. No. 7,717,658, the disclosure of which is hereby incorporated herein by reference.

The conductor splice arrangement 132 also can include cold-applied sleeves 133 to connect the insulation layers 113 of the conductors 112 to form the extended insulated conductors (FIGS. 12, 14-16, and 20). Each sleeve 133 is configured to surround one of the shear bolt connectors 131 that couples together one set of conductors 112A, 112B. In some implementations, the sleeves 133 include one or more layers of shielding and one or more layers of insulation. In certain implementations, the sleeves 133 include one layer of shielding surrounding one layer of insulation. The shielding layer of the sleeve 133 connects the shields of the insulation layers 113 of the insulated conductors 112A, 112B. Additional information regarding example conductor splice arrangements 132 suitable for use in a cable splice arrangement 130 are disclosed in U.S. Pat. No. 7,901,243, the disclosure of which is hereby incorporated herein by reference.

A fiber installation step 173 positions optical fibers 200 within the extended power cable 118. In some implementations, a separate fiber pull arrangement 210, 220, 230, 240, 250 is drawn through each cable segment 110. For example, each fiber pull arrangement 210, 220, 230, 240, 250 can be pulled through a respective cable power segment 110 using the fiber installation process 165 of FIG. 10. In such implementations, a splice step 174 optically couples (e.g., mechanical splice, fusion splice, etc.) the optical fibers 200 of adjacent fiber pull arrangements 210, 220, 230, 240, 250.

Figure 12:
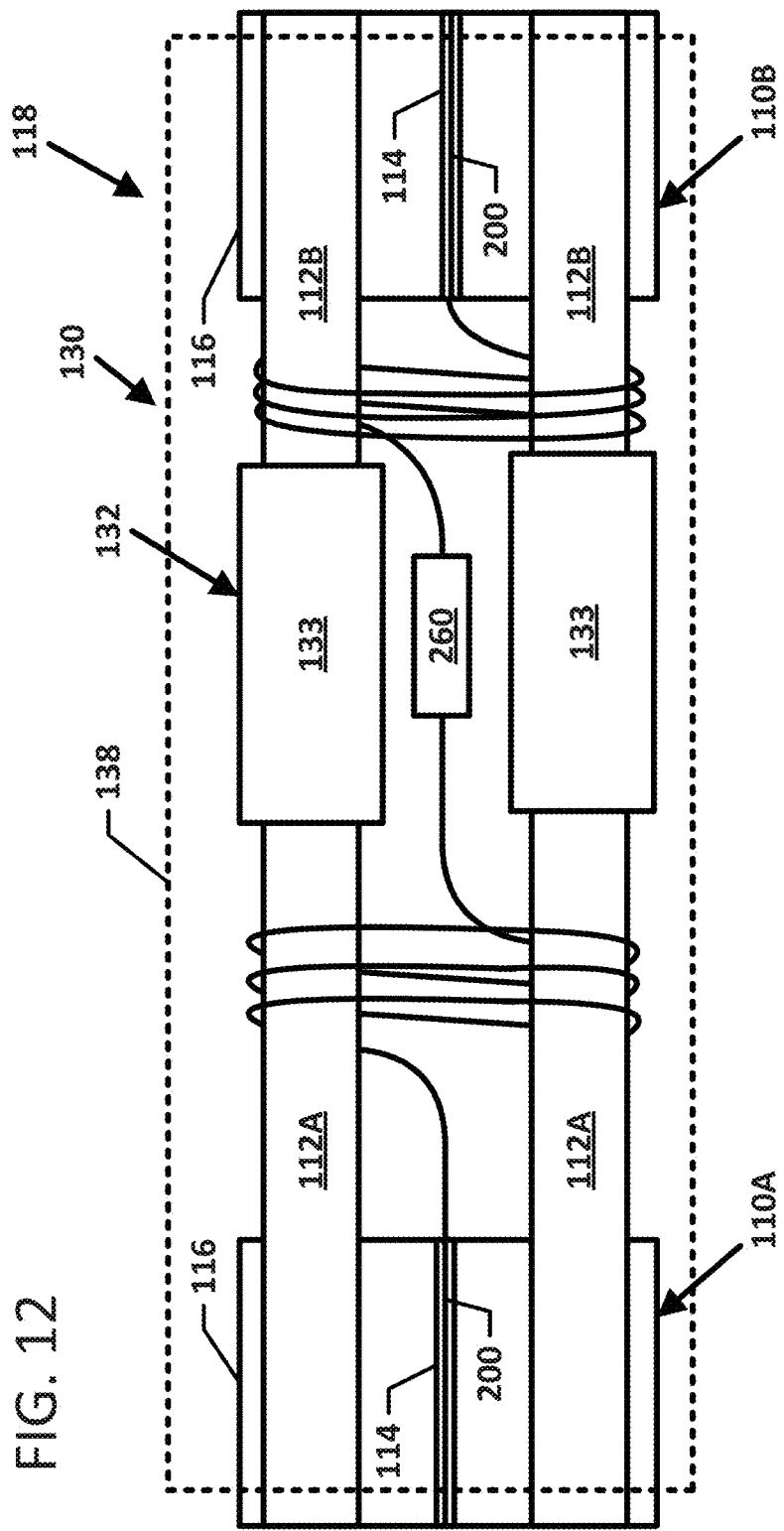
FIG. 12 is a schematic diagram showing optical fibers spliced at a location within a transverse cross-sectional area of the cable.

For example, in FIG. 12, one or more optical fibers 200 routed through a first cable segment 110A are coupled at splice 260 to one or more optical fibers 200 routed through a second cable segment 110B. In some implementations, the splice 260 can be disposed between the conductors 112. In other implementations, the splice 260 can be disposed between one of the conductors 112 and the sheath 116. In still other implementations, the splice 260 can be routed outside of the power cable 118 as will be described in more detail herein with reference to FIGS. 13 and 14.

In other implementations, a single fiber pull arrangement 210, 220, 230, 240, 250 is drawn through multiple cable segments 110. For example, the fiber pull arrangement 210, 220, 230, 240, 250 can be longer than the first cable segment 110. The fiber pull arrangement 210, 220, 230, 240, 250 is drawn through a first cable segment 110 (e.g., using the fiber installation process 165 of FIG. 10) so that excess length of the fiber pull arrangement 210, 220, 230, 240, 250 extends out from a first end of the first cable segment 110.

The pulling member 120 of the first cable segment 110 is disconnected from the fiber pull arrangement 210, 220, 230, 240, 250 and the pulling member 120 of an adjacent cable segment 110 is attached to the fiber pull arrangement 210, 220, 230, 240, 250. The excess length of the fiber pull arrangement 210, 220, 230, 240, 250 is pulled through the installation tube 114 of the adjacent cable segment 110. The disconnection, attachment, and pulling steps are repeated until the fiber pull arrangement 210, 220, 230, 240, 250 extends across the extended power cable 118.

A seal step 175 physically connects the power cable segments 110 together at sealed joints to form the extended cable 118. The components of the extended power cable 118 are protected from an external environment by the sealed joints. In some implementations, the cable splice arrangement 130 also includes a sheath connecting arrangement 138 (FIGS. 12, 16, and 20) to physically connect the segment sheaths 116 together. In some implementations, the sheath connecting arrangement 138 includes a wrap (e.g., one or more layers of tape, mesh, wire, etc.) wound around the segment sheaths 116. The connecting arrangement 138 is configured to: a) electrically connects shield layers of the segments 110 that are incorporated into the sheaths 116; b) seals and protects the splice locations (e.g., power splices and/or fiber splices); and/or c) mechanically connects the sheaths 116 of the power cable segments 110. In other implementations, the cable splice arrangement 130 can be over-molded or otherwise encased by an insulating material (e.g., a heat shrink or cold applied sleeve).

Figure 13:
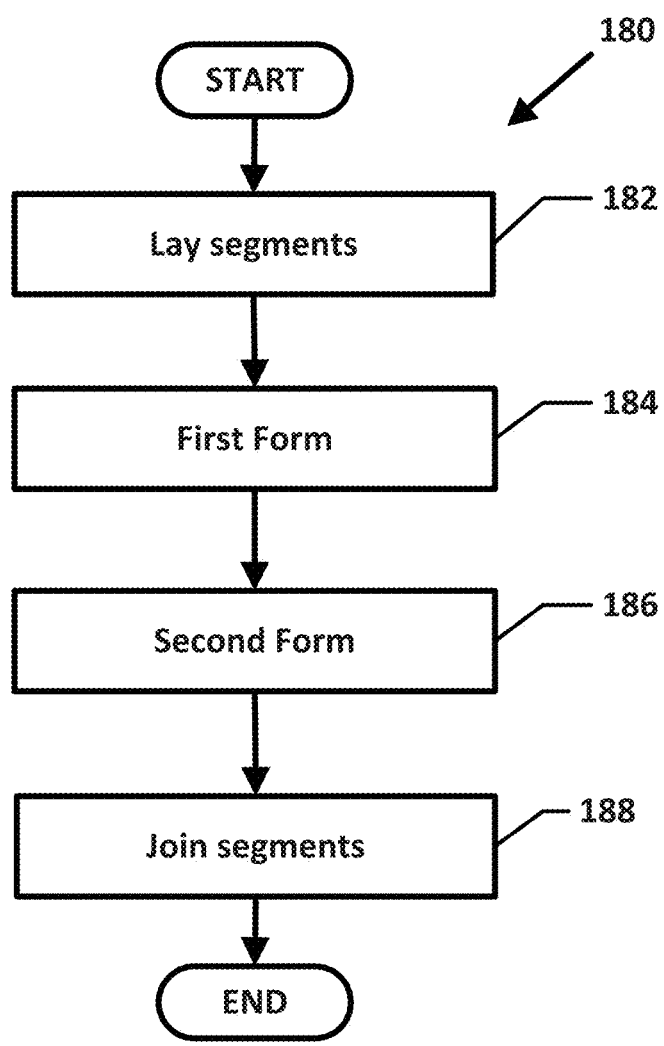
FIG. 13 is a flowchart illustrating another deployment process for a hybrid cable including multiple cable segments.

FIG. 13 illustrates an example deployment process 180 for deploying an extended power cable 118 including multiple cable segments 110 and configured to enable installation of optical fibers 200 subsequent to the deployment. In some implementations, a single fiber pull arrangement 210, 220, 230, 240, 250 can be installed in the extended power cable 118. The deployment process 180 begins by routing (see step 182) two or more adjacent cable segments 110 that will form the extended power cable 118 through the underground pipe 101 or other conduit between access points. The cable segments 110 are positioned with facing axial ends that are spaced from each other.

The deployment process 180 forms the extended pulling member 125 at the first form step 184. In some implementations, ends of the fiber installation tubes 114 can be stripped to reveal ends 121, 123 of the pulling members 120. In other implementations, however, the pulling members 120 can be sufficiently long to be accessed without stripping the fiber installation tubes 114. The revealed ends 121, 123 of the pulling members 120 are coupled together. For example, a knot is separately tied at the end 121, 123 (e.g., see FIG. 15). In other implementations, the pulling members 120 can be directly tied or otherwise coupled together. A heat shrink tube 135 is slid over the knotted ends and heated to secure the pulling members 120 together into an extended pulling member 125 (see FIG. 16).

The deployment process 180 also forms the extended installation conduit 115 at a second form step 186. A fiber splice arrangement 134 is disposed at the connection of the installation tubes 114. The fiber splice arrangement 134 includes a closure member 137 (e.g., a clam-shell housing) installed around the facing ends of the fiber installation tubes 114 (see FIG. 17). When installed, the closure member 137 surrounds and protects the heat shrunk tube 135. The closure member 137 also can securely attach to the outer jackets 126 of the fiber installation tubes 114 to physically join the fiber installation tubes 114 together in a fiber installation conduit 115.

A join step 188 physically and electrically connects the power cable segments 110 together. In some implementations, a conductor splice arrangement 132 can connect the conductors 112 of the cable segments 110. For example, shear bolt connectors 131 can be mounted over the ends of the conductive members 111 of the conductors 112A, 112B and cold-applied sleeves 133 can be applied to the insulation layers 113 of the conductors 112 to form the extended insulated conductors. The join step 118 applies a sheath connecting arrangement 138 to physically connect the segment sheaths 116 together. The sheath connecting arrangement 138 is disposed around the facing ends of the power cable segments 118. For example, one or more layers of shielding and insulation can be wrapped around the splice location to cover the conductor splice arrangement 132 and the fiber tube connecting arrangement 134. The deployment process 180 is repeated for each adjacent pair of cable segments 110 and then ends (see step 179).

Figure 14:
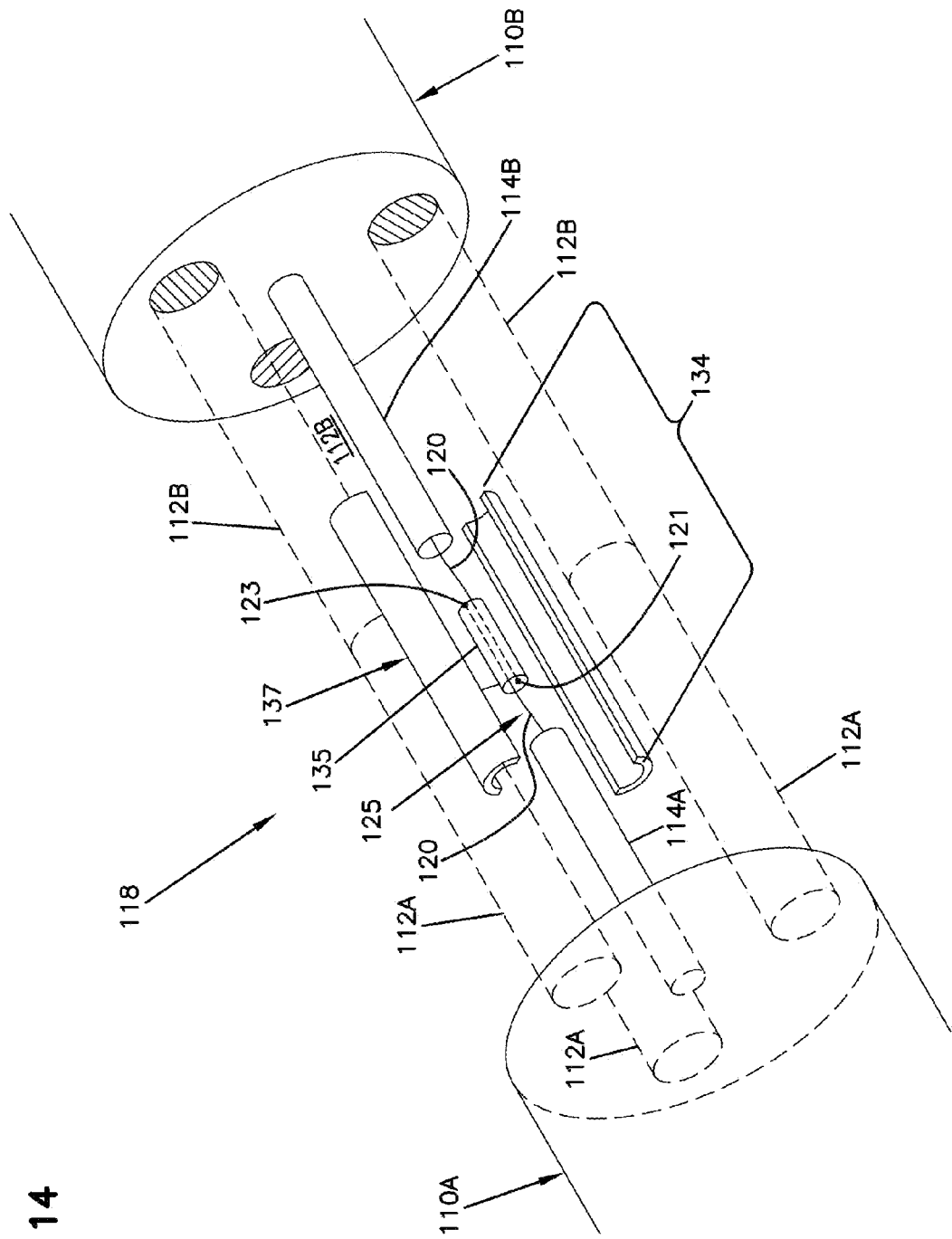
FIG. 14 is a schematic diagram of a splice point of a hybrid cable prior to complete assembly in which the fiber tube connecting arrangement including a split housing connecting the reinforced fiber installation tubes of the spliced power cable segments is visible.
Figure 15:
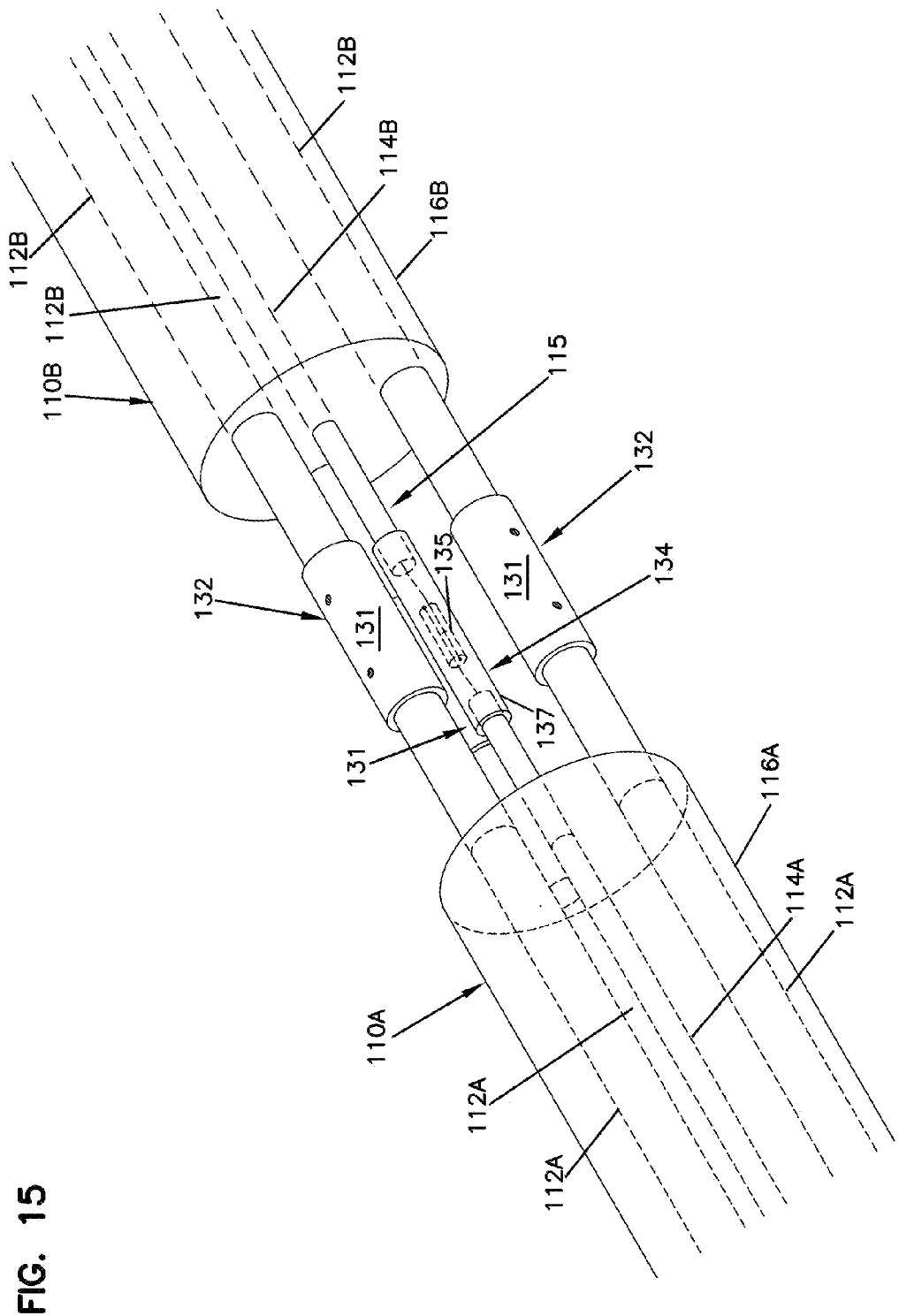
FIG. 15 is a schematic diagram of the splice point of FIG. 14 with shear-bolt connectors shown connecting the electrical conductors of the spliced power cable segments and with the fiber tube connecting arrangement connecting the reinforced fiber installation tubes of the spliced power cable segments.
Figure 16:
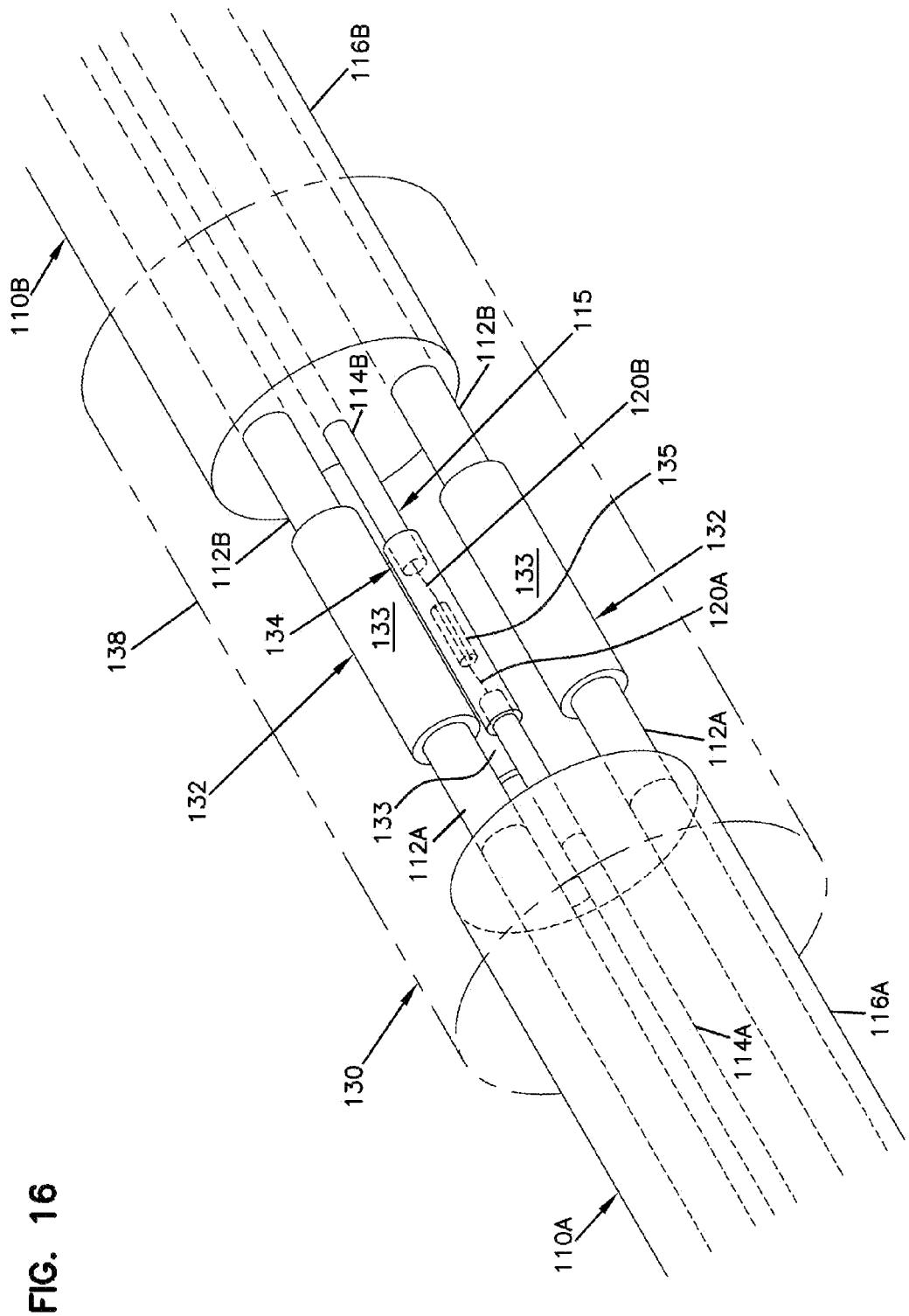
FIG. 16 is a schematic diagram of the splice point of FIG. 15 with cold applied sheaths providing an electrical connection between the shields of the spliced conductors, and with a sheath connecting arrangement covering the entire splice location between the two power cable segments.

FIGS. 14-16 show an example cable splice arrangement 130 in various stages of assembly. The cable splice arrangement 130 couples together a first power cable segment 110A and a second power cable segment 110B. Each power cable segment 110A, 110B shown includes three electrical conductors 112A, 112B, a fiber installation tube 114A, 114B, and a sheath 116A, 116B, respectively. Coupling the power cable segments 110A, 110B together forms an extended power cable 118. The extended power cable 118 includes spliced conductors 112A, 112B, a fiber installation conduit 115 containing an extended pulling member 125, and spliced sheaths 116A, 116B.

The cable splice arrangement 130 includes a conductor splice arrangement 132 (FIGS. 15 and 16) that electrically couples the conductors 112A, 112B. For example, the conductor splice arrangement 132 can include a shear bolt connectors 131 having conductive sleeves into which ends of the conductive members 111 of the conductors 112A, 112B are inserted (see FIG. 15). In an example, one shear bolt connector 131 is used to couple together one pair of conductors 112A, 112B.

The conductor splice arrangement 132 also can include cold-applied sleeves 133 to connect the insulation layers 113 of the conductors 112 to form the extended insulated conductors (see FIG. 16). Each sleeve 133 is configured to surround one of the shear bolt connectors 131 that couples together one set of conductors 112A, 112B. In some implementations, the sleeves 133 include one or more layers of shielding and one or more layers of insulation. In certain implementations, the sleeves 133 include one layer of shielding surrounding one layer of insulation. The shielding layer of the sleeve 133 connects the shields of the insulation layers 113 of the insulated conductors 112A, 112B.

The cable splice arrangement 130 also includes a tube connecting arrangement 134 for coupling together the first and second fiber installation tubes 114A, 114B to form the fiber installation conduit 115 (see FIG. 14). In some implementations, the tube connecting arrangement 134 includes a pulling member interconnect location 135. The pulling member interconnect location 135 connects the pulling members 120A, 120B of the fiber installation tubes 114A, 114B to form the extended pulling member 125. In some implementations, the pulling member interconnect location 135 includes a heat-shrink tube mounted over coupled (e.g., knotted) ends 121, 123 of the pulling members 120. Adhesive may be applied to the pulling member ends inside the heat-shrink tube. In other implementations, the second end 123 of the first pulling member 120A can be tied or otherwise directly attached (e.g., taped) to the first end 121 of the second pulling member 120B.

The tube connecting arrangement 134 also includes a closure 137 that connects the outer jackets 126 (FIGS. 2 and 3) of the fiber installation tubes 114A, 114B to provide the continuous, uninterrupted fiber installation passage/conduit across the splice location. In some implementations, the closure 137 includes a multi-piece enclosure that surrounds the jackets 126 at adjacent ends of the fiber installation tubes 114A, 114B. For example, certain types of closures 137 include clam-shell enclosures or other types of split housings. For ease in viewing, an example two-piece closure 137 is shown exploded outwardly from the pulling member interconnect location 135 in FIG. 14. In other implementations, the fiber installation tubes 114A, 114B can be glued, friction fit, crimped, or otherwise secured to the second closure 137.

The cable splice arrangement 130 also includes a sheath connecting arrangement 138 that holds together the sheaths 116A, 116B of the power cable segments 110A, 110B (see FIG. 16). In the example shown, the terminated ends of the sheaths 116A, 116B are spaced from each other within the sheath connecting arrangement 138 to accommodate the conductor splice arrangement 132 and tube connecting arrangement 134 (see FIG. 16). In some implementations, the sheath connecting arrangement 138 includes one or more wrapped layers (e.g., tape, strength layers, etc.) that wind around the cable segment sheaths 116A, 116B. In certain implementations, the wrapped layers include one or more shielding layers (e.g., metal mesh, wires, or sheets) for connecting shielding within the cable segment sheaths 116A, 116B.

Figure 17:
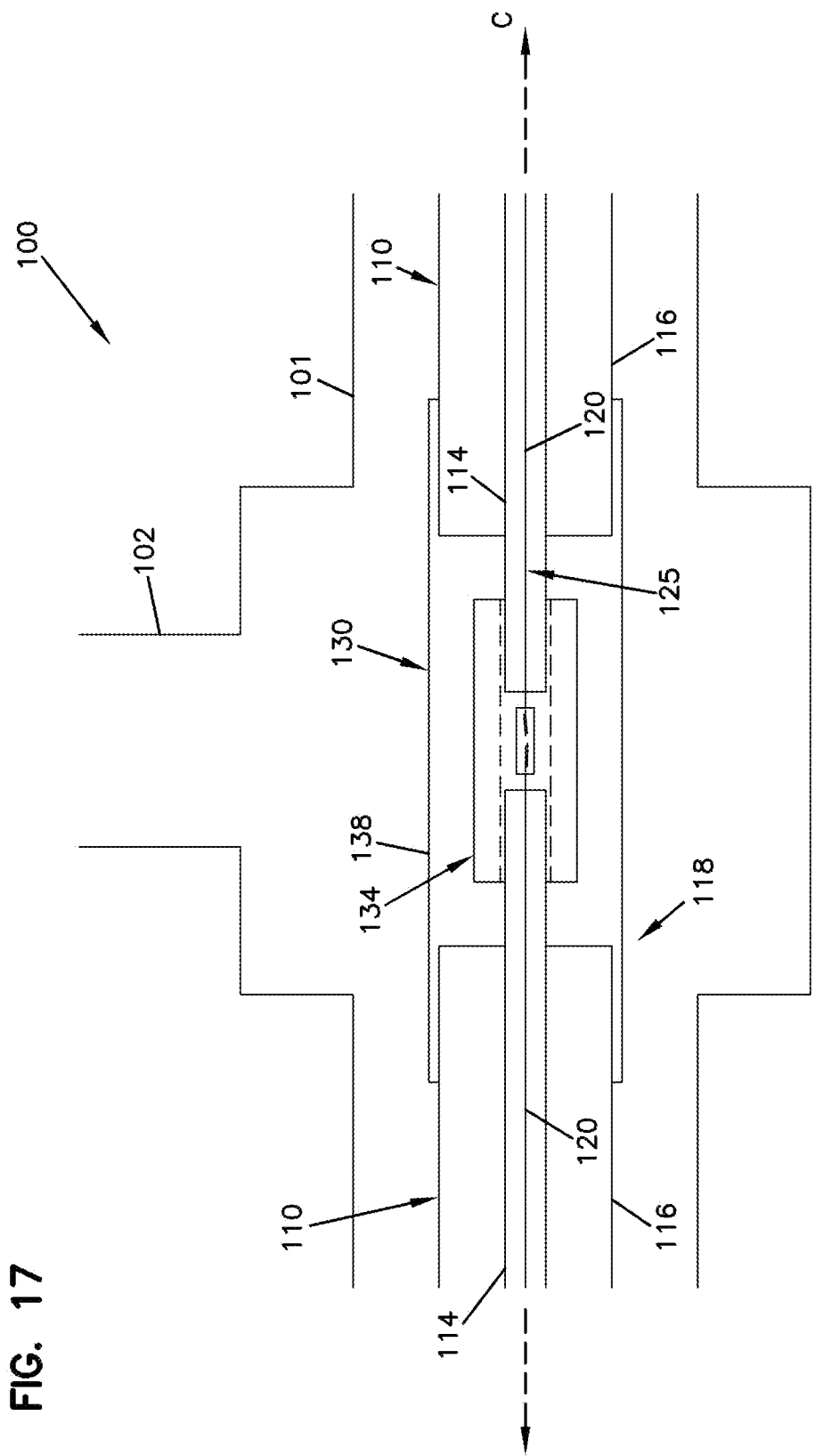
FIG. 17 schematically shows an underground power cable installation having the power cable segments of FIGS. 14-16 spliced together at splice points, the power cable installation also includes an internal fiber installation conduit that extends across the splice points.

FIG. 17 shows a cable installation system 100 including an underground pipe 101 having one or more access points 102. An example extended power cable 118 routed through the pipe 101 includes first and second power cable segments 110A, 110B connected together (e.g., spliced) at an access point 102. In the example shown, the access point 102 is depicted as a manhole. In other examples, however, the access points 102 can be implemented as handholes, closure boxes, or other node points. In still other implementations, the pipe 101 need not be routed underground, but can instead be an aerial duct or above-ground duct. Additionally, the power cable 118 could also be direct buried. The conductors 112 are removed from view in FIG. 17 for ease in viewing the remaining components.

To install optical fibers 200 into the extended power cable 118, one end of the power cable 118 is accessed. A fiber pull arrangement 210, 220, 230, 240, 250 is attached to one end of the extended pulling member 125 of the cable 118. The other end of the pulling member 125 is accessed and drawn out of the extended installation tube 115. The fiber pull arrangement 210, 220, 230, 240, 250 is pulled through the extended installation tube 115 without need to interfere with the sealed joints of the cable 118. The opposite ends of the optical fibers 200 are managed (e.g., stored) after the fibers 200 are installed in the cable 118. For example, the fibers 200 can be terminated, spliced, or stored in spools.

In some implementations, the stored excess length of the optical fibers can enable one or more optical fibers to be broken out from the fiber installation conduit 115 at various locations along the extended power cable 118 (e.g., at one or more of the access points 102 of the pipe 101). Breaking out the fibers enables access to the optical network at the breakout points. In certain implementations, ancillary products can be provided to enable sealing and re-sealing of the fiber installation conduit 115 to inhibit water or other forms of external contamination from entering the conduit 115. The excess length of the optical fibers provides sufficient slack to pull out a terminated segment of the optical fibers from the fiber installation conduit 115 a sufficient distance to splice, connectorize, or otherwise process the terminated end.

In other implementations, the stored excess length of the optical fibers includes sufficient length to extend completely through the fiber installation conduit 115. In such implementations, if damage occurs to one or more of the fibers within the extended power cable 118, a pulling member can be coupled to one end of the fiber pull arrangement 210, 220, 230, 240, 250. The damaged section of the fiber pull arrangement 210, 220, 230, 240, 250 can thereby be pulled out of the extended power cable 118 and replaced by some of the slack length of the fiber pull arrangement 210, 220, 230, 240, 250.

Figure 18:
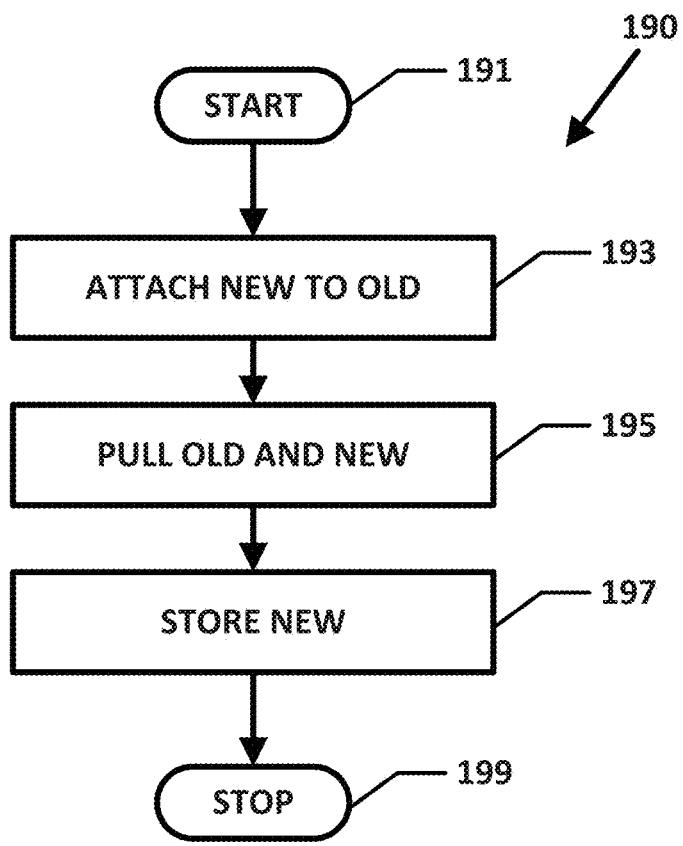
FIG. 18 is a flowchart illustrating another example fiber replacement process that can be implemented to replace old, damaged, or previously installed optical fibers installed within an extended power cable with new, undamaged, or updated optical fibers.

FIG. 18 is a flowchart illustrating another example fiber replacement process 190 that can be implemented to replace old, damaged, or previously installed optical fibers installed within an extended power cable 118 with new, undamaged, or updated optical fibers. In some implementations, lubrication is introduced into the installation tube 114 to facilitate removal of the old fiber pull arrangement 210, 220, 230, 240, 250 and installation of the new fiber pull arrangement 210, 220, 230, 240, 250. In certain implementations, liquid lubrication is introduced into the installation tube 114.

The replacement process 190 begins (step 191) by attaching (see step 193) a new fiber pull arrangement 210, 220, 230, 240, 250 to the old fiber pull arrangement 210, 220, 230, 240, 250 currently installed in the fiber installation conduit 115. The new fiber pull arrangement 210, 220, 230, 240, 250 includes the new, undamaged, or updated optical fibers 200 held by a tape 214 or wrapping 242 or strength members 235, 245, 255. In some implementations, the new tape 214, wrapping 244, or strength members 235, 245, 255 can be attached to the old tape 214, wrapping 244, or strength members 235, 245, 255. In other implementations, a pulling member 120 can be installed between the two fiber pull arrangements 210, 220, 230, 240, 250. In some implementations, the old fiber pull arrangement 210, 220, 230, 240, 250 is accessed at a fiber optic closure. In other implementations, the old fiber pull arrangement 210, 220, 230, 240, 250 is accessed at one end of the power cable 118.

The old fiber pull arrangement 210, 220, 230, 240, 250 is pulled (see step 195) out of the fiber installation conduit 115. In some implementations, the old fiber pull arrangement 210, 220, 230, 240, 250 is pulled manually by one or more users. In other implementations, the old fiber pull arrangement 210, 220, 230, 240, 250 is pulled by a tension controlled pulling apparatus. Pulling out the old fiber pull arrangement 210, 220, 230, 240, 250 pulls the new fiber pull arrangement 210, 220, 230, 240, 250 through the fiber installation conduit 115. Any excess length of the new fiber pull arrangement 210, 220, 230, 240, 250 is stored (see step 197) as discussed above and the replacement process 190 ends (step 199).

Figure 19:
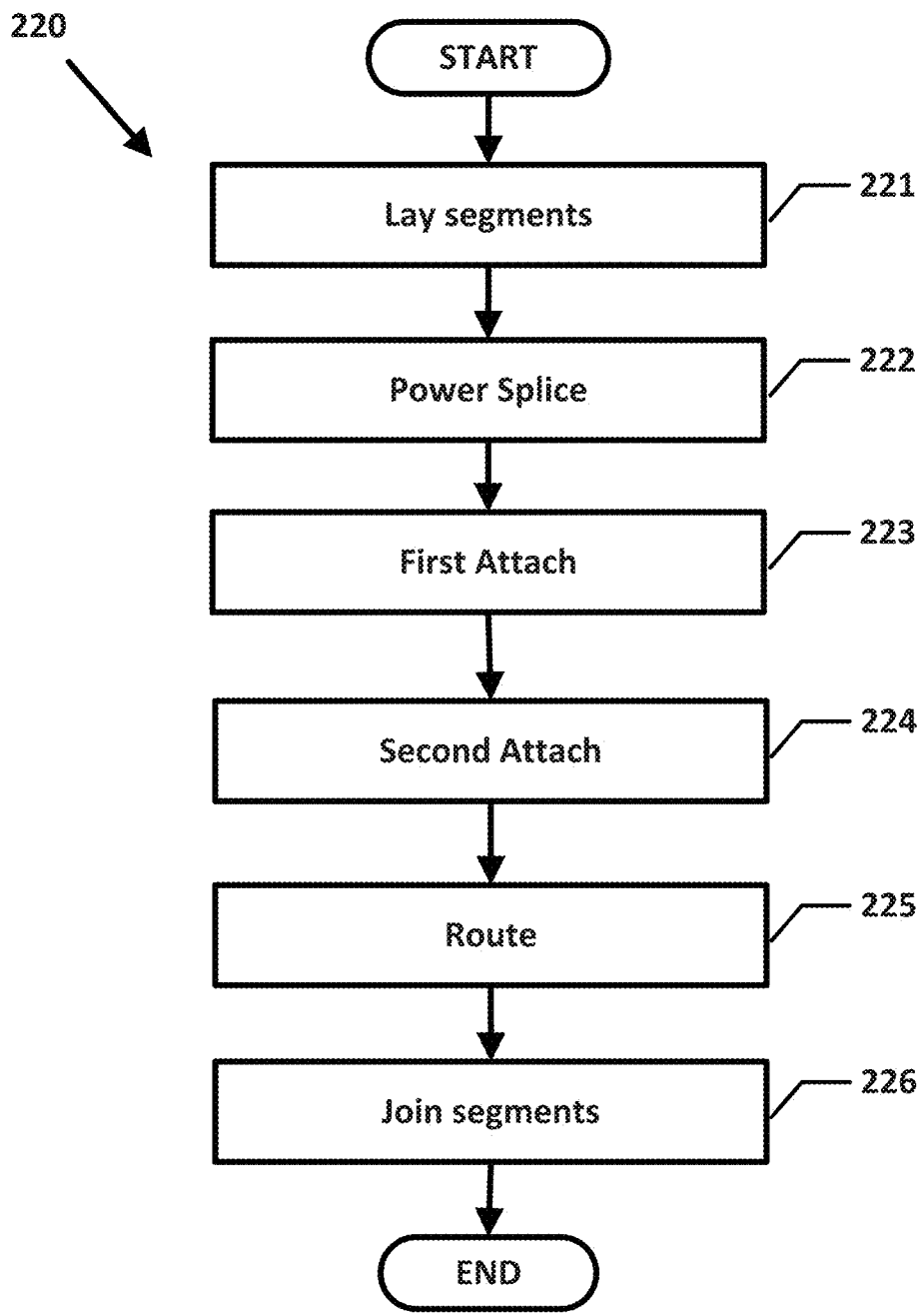
FIG. 19 is a flowchart illustrating another deployment process for a hybrid cable including multiple cable segments.

FIG. 19 illustrates another example deployment process 220 for deploying an extended power cable 118 that is configured to enable installation of optical fibers 200 subsequent to the deployment. The power cable 118 includes multiple cable segments 110 and one or more fiber optic closures 250 at which installed optical fibers 200 can be accessed (see FIG. 20). In some implementations, separate fiber pull arrangements 210, 220, 230, 240, 250 can be installed in each segment 110 of the extended power cable 118. The fiber pull arrangements 210, 220, 230, 240, 250 are connected to each other at the fiber optic closure 250 (see FIG. 20). The closure box 250 can be spaced from the cable segments 110.

The deployment process 220 begins by routing (see step 221) two or more adjacent cable segments 110 that will form the extended power cable 118 through the underground pipe 101 or other conduit between access points 102. The cable segments 110 are positioned with facing axial ends that are spaced from each other. A splice step 222 physically and electrically couples the conductors 112 of adjacent cable segments 110. For example, as noted above, the conductors 112 can be joined together using a conductor splice arrangement 132.

Figure 20:
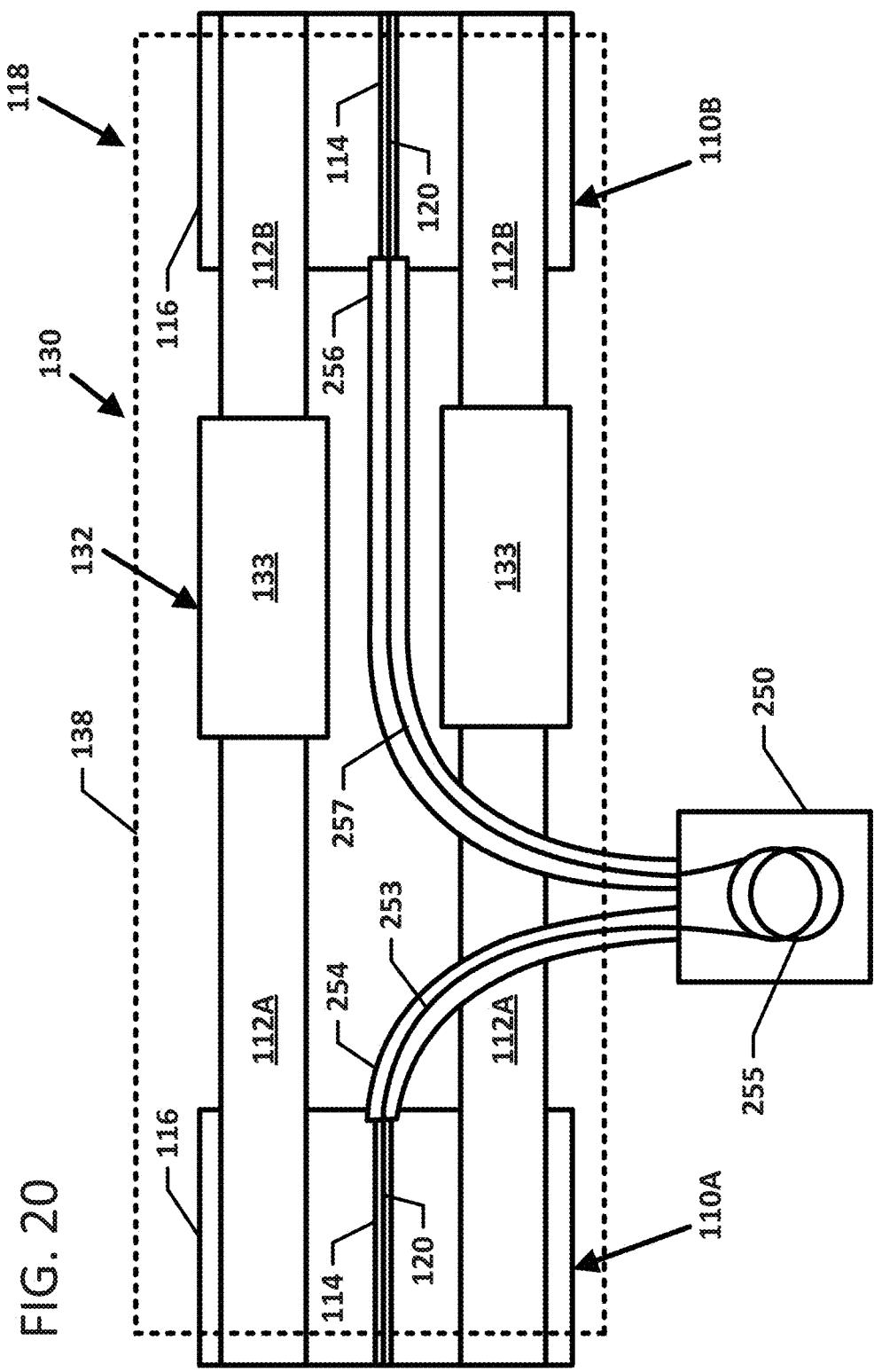
FIG. 20 is a schematic diagram of a splice point between two power cable segments using a fiber optic closure.

A first attachment step 223 adds additional length 253, 257 to the pulling members 120 of the adjacent cable segments 110A, 110B, respectively (see FIG. 20). For example, the additional lengths 253, 257 of the pulling members 120 can be tied, glued, connected via heat shrink tubing, or otherwise coupled together. In some implementations, the additional length 253, 257 is sufficiently long to enable ends 121, 123 of the pulling members 120 to be routed to a closure box 250. In certain implementations, excess length of the pulling members 120 can be stored (see 255 of FIG. 20) at the closure box 250.

A second attachment step 224 adds additional length 254, 256 to the installation tubes 114 of the adjacent cable segments 110A, 110B, respectively (see FIG. 20). For example, the additional lengths 254, 256 can be threaded over the additional lengths of pulling members 120 and coupled (e.g., extends over or onto, crimped to, secured with heat shrink tubing, etc.) to the facing ends of the installation tubes 114. In some implementations, the additional lengths 254, 256 of the installation tubes 114 have the same dimensions and include the same material as the installation tubes 114. In other implementations, the additional lengths 254, 256 of the installation tubes 114 include larger and/or more ruggedized (i.e., environmentally sealed) tubes.

A route step 225 couples the free ends of the additional lengths to the closure 250. For example, the additional length 254 of one installation tube 114 can be routed to a first sealed port defined by the closure 250 and the additional length 256 of another installation tube 114 can be routed to a second sealed port defined by the closure 250. Accordingly, optical fibers 200 subsequently routed into the cable 118 can be sealed between the installation tubes 114 and the closure 250. The pulling member additional lengths 253, 257 can be routed into the closure 250. The closure 250 enables repeatable access to the optical fibers 200 as will be described herein.

When the closure 250 is coupled to the cable 118 via the tube additional lengths 254, 256, a join step 226 connects the conductors 112 and sheaths 116 of the adjacent cable segments 110. For example, the join step 226 couples the conductors 112 using a conductor splice arrangement 132 and couples the sheaths 116 using a sheath connecting arrangement 138 as described above. In certain implementations, the closure 250 is located outside of the sheath connecting arrangement 138. In other implementations, however, the closure 250 could be located within the sheath connecting arrangement 138. The deployment process 220 is repeated for each adjacent pair of cable segments 110 and then ends.

FIG. 20 illustrates a portion of one example extended power cable 118 including a first cable segment 110A and a second cable segment 110B. Additional lengths 253, 257 extend from the pulling members 120 of the segments 110 towards the closure 250. Additional lengths 254, 256 extend from the installation tubes 114 of the segments 110 towards the closure 250. The pulling member additional lengths 253, 257 are managed within the closure 250 at a management portion (e.g., a spool or other storage structure) 255. In the example shown, the closure 250 is located outside the sheath connecting arrangement 138.

The closure 250 can be accessed subsequent to deployment of the power cable 118. Accordingly, the pulling members 120 routed to the closure 250 can be accessed to enable installation of the optical fibers 200. In some implementations, the closure 250 is located outside the joint seal (e.g., sheath connecting arrangement 138) and can be accessed without disturbing the joint seal. In other implementations, the closure 250 is located within the join seal and the joint seal is disassembled to access the closure 250.

In some implementations, optical fibers 200 can be installed in the extended power cable 118 by pulling a separate fiber pull arrangement 210, 220, 230, 240, 250 through the installation tube 114 of each segment 110 towards the closure 250. For example, a first fiber pull arrangement 210, 220, 230, 240, 250 can be coupled to one end 121, 123 of the pulling member 120 of the first cable segment 110A and drawn through the corresponding installation tube 114 towards the closure 250. A second fiber pull arrangement 210, 220, 230, 240, 250 can be coupled to an end 121, 123 of the pulling member 120 of the second cable segment 110B and drawn through the corresponding installation tube 114 towards the closure 250. The optical fibers 200 of the first and second fiber pull arrangement 210, 220, 230, 240, 250 can be spliced (e.g., mechanically spliced, fusion spliced, etc.) or otherwise coupled together (e.g., connectorized and plugged into opposite sides of an adapter) at the closure 250.

In other implementations, optical fibers 200 can be installed in the extended power cable 118 by pulling the fibers 200 out of the closure 250 and into the cable segments 110. For example, one or more fiber pull arrangements 210, 220, 230, 240, 250 can be stored at the closure 250. In certain implementations, a first fiber pull arrangements 210, 220, 230, 240, 250 is pulled away from the closure 250 and into the installation tube 114 of the first cable segment 110A (e.g., via the rugged tube 254) and a second fiber pull arrangements 210, 220, 230, 240, 250 is pulled away from the closure 250 and into the installation tube 114 of the second cable segment 110B (e.g., via the rugged tube 256). The optical fibers 200 of the first and second fiber pull arrangements 210, 220, 230, 240, 250 can be spliced together at the closure 250.

In certain implementations, a first end of a fiber pull arrangement 210, 220, 230, 240, 250 can be pulled from the closure 250 and into the installation tube 114 of the first cable segment 110A (e.g., via the rugged tube 254) and a second end of the fiber pull arrangement 210, 220, 230, 240, 250 is pulled away from the closure 250 and into the installation tube 114 of the second cable segment 110B (e.g., via the rugged tube 256). In such implementations, a continuous length of optical fibers 200 extends along the adjacent cable segments 110.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A hybrid cable comprising:
   (a) a plurality of sheaths having axial ends coupled together by sheath connecting members to form an extended cable;
   (b) a plurality of insulated conductor having axial ends coupled together by conductor splice arrangements to form extended insulated conductors within the extended cable;
   (c) a plurality of fiber installation tubes having axial ends coupled together by tube connecting members to form a fiber installation conduit within the extended cable; and
   (d) a fiber pull arrangement disposed within the fiber installation conduit, the fiber pull arrangement including a plurality of optical fibers coupled to a strength member.

2. The hybrid cable of claim 1, wherein the conductor splice arrangements comprise shear bolt assemblies.

3. The hybrid cable of claim 1, wherein the tube connecting members include closure members configured to secure to exterior surfaces of the axial ends of adjacent ones of the fiber installation tubes.

4. The hybrid cable of claim 3, wherein the closure members include clam-shell housings.

5. The hybrid cable of claim 1, wherein the fiber pull arrangement includes at least one optical fiber ribbon adhered to a reinforcing tape.

6. The hybrid cable of claim 5, wherein the reinforcing tape includes aramid tape.

7. The hybrid cable of claim 5, wherein the reinforcing tape includes Ultra-high-molecular-weight polyethylene fiber or tape.

8. The hybrid cable of claim 1, wherein the fiber installation tubes are at least partially formed from cross-linked polyethylene.

9. The hybrid cable of claim 1, wherein the fiber pull arrangement includes an optical cable including a plurality of optical fibers, a strength layer, and a jacket.

10. The hybrid cable of claim 9, wherein the optical fibers are arranged in multiple layers.

11. The hybrid cable of claim 9, wherein the fiber pull arrangement also includes a center rod disposed within the jacket.

12. The hybrid cable of claim 1, wherein the fiber pull arrangement includes a dry lubricant disposed over an exterior of the fiber pull arrangement.

13. The hybrid cable of claim 1, wherein the fiber pull arrangement includes a liquid lubricant disposed over an exterior of the fiber pull arrangement.

14. The hybrid cable of claim 1, wherein the fiber pull arrangement includes a textured surface to decrease surface area contact between the fiber pull arrangement and the fiber installation conduit.

* * * * *